United States Patent [19]

Sterlini

[11] Patent Number: 4,718,237

[45] Date of Patent: Jan. 12, 1988

[54] THERMAL INDUCTION MACHINE

[75] Inventor: Jacques Sterlini, Paris, France

[73] Assignee: Alsthom, Paris, France

[21] Appl. No.: 842,701

[22] Filed: Mar. 21, 1986

Related U.S. Application Data

[63] Continuation-in-part of Ser. No. 683,537, Dec. 19, 1984, abandoned.

[30] Foreign Application Priority Data

Dec. 22, 1983 [FR] France .................... 83 20573

[51] Int. Cl.$^4$ ............................................ F01K 25/06
[52] U.S. Cl. ...................................... 60/673; 62/476
[58] Field of Search ................... 60/649, 673; 62/476, 62/485, 495

[56] References Cited

U.S. PATENT DOCUMENTS 4,442,677 4/1984 Kauffman .................... 60/649 X

Primary Examiner—Stephen F. Husar
Attorney, Agent, or Firm—Sughrue, Mion, Zinn, Macpeak and Seas

[57] ABSTRACT

The purpose of a thermal induction machine is to put thermal resources and thermal uses ($Q_o$, $Q_1$, $Q'_1$, $Q_2$) into relation, so as to valorize the energy of the resources, the device operating in very similar fashion to reversibility with a binary working fluid used in diphasic form. It includes a first direct assembly of heat transfer elements inserted serially on the liquid and working fluid vapor flows. The first assembly consists of a first diphasic contact column (Kd) operating at an initial pressure value. It also includes a second assembly of heat transfer elements. The second assembly is reverse to the first and containing the same number of elements and notably a second diphasic contact column (Kg), the second column working at a second pressure value lower than the first value, adventitious flows ($m_o$, $m'_o$, $m_1$, $m'_1$) being established between the two assemblies on the terminals of the homologous elements. All the parts of the device have a temperature between any two values (columns, adventitious flows) exchanging heat between them. The adventitious flows and their direction are adjusted so that the two columns receive at all points, during exchanges, the quantities of heat corresponding to their thermal activity.

6 Claims, 53 Drawing Figures

FIG. 19
FIG. 20
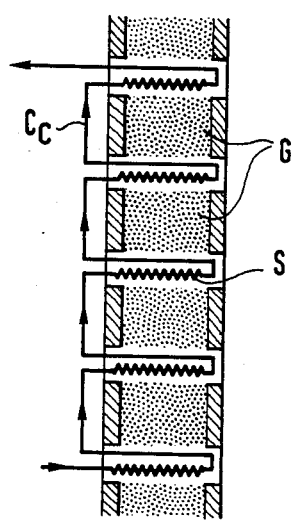
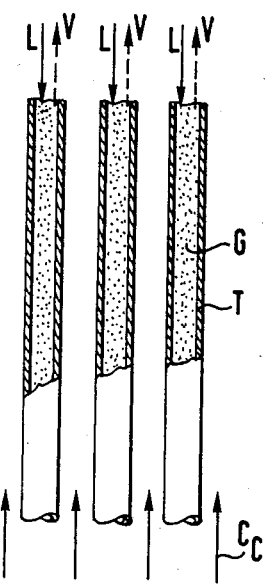
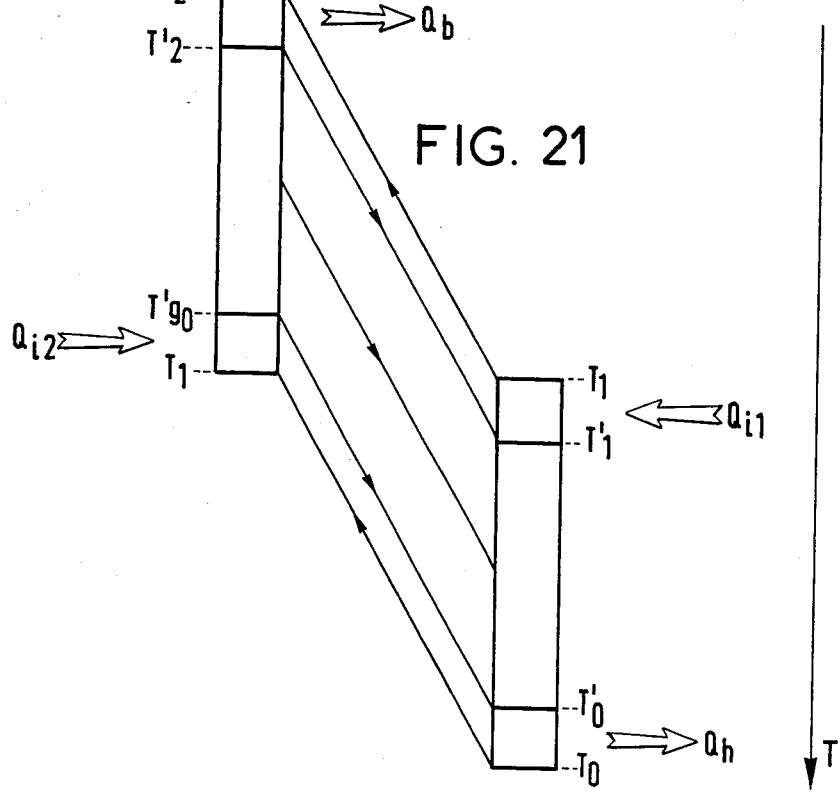
FIG. 21

THERMAL INDUCTION MACHINE

FIELD OF THE INVENTION

This application is a continuation-in-part of application Ser. No. 683,537, identically entitled, filed Dec. 19, 1984, now abandoned.

This invention relates to a thermal induction machine designed to put thermal resources and thermal uses into relation, so as to valorize the thermal energy of the resources.

BACKGROUND OF THE INVENTION

The need for energy saving is well known. A means of doing so is to use the existing enthalpic resources and have them evolve from their present temperature to a use temperature, whilst preserving their energy content. As an example of an enthalpic resource and high temperature level, one can mention steam at 500° C. from the thermal power station. The present day means of preserving the maximum energy of this resource is to use a turbine producing mechanical energy transformable into electric energy.

It can be seen that the installation requires heavy investments.

Another example is that of an enthalpic source at low temperature level (plant thermal reject, for example water at 45°).

The enthalpic content of this source can be used for heating premises for example, by increasing its temperature up to 80° via a heat pump.

Conventional compressed working fluid type heat pumps have a mediocre performance coefficient.

Dynamic elements (compressors) subject to wear and requiring maintenance, are needed.

Absorption pumps use a static process, but their efficiency is essentially mediocre due to the structure of their thermal cycle.

One aim of the invention is to obtain a thermal machine only involving practically reversible thermal exchanges, so as to avoid the degradation of the energy content of the thermal resources used.

Another aim of the invention is to produce a machine which, either only contains static components, so that it is sturdy and subject to very little wear, or which combines static and dynamic components, but with an energy efficiency well above that produced by systems following the known thermal cycles.

One aim of the invention is to produce a reversible thermal machine, i.e., capable of receiving thermal energy at an average temperature level and valorizing this energy by increasing it to high temperature, but also to receive energy at low and high level and supplying at an intermediate level.

Another aim is to obtain thermal devices whose manufacturing costs are notably lower as compared to thermal machines of the same power.

To clearly understand the structure and operating of the thermal device in the invention, it is necessary to recall a number of thermodynamic notions and give a certain number of definitions.

The initial idea leading to the device in the invention is that it is possible to make practically reversible static thermal transfers. This notion of practically reversible static thermal transfer originates in the study of distillation.

FIG. 1 shows diagrammatically a distilling column 1 designed to distill a mixture of two substances A and B, A being the most volatile. The column is associated to a distiller 2 and a condenser 3. The axis of the temperatures T is directed towards the bottom of the figure.

The mixture A+B is entered into the column at a temperature $T_2$; substance B, of controlled purity, flows out fluid at the bottom of the column at temperature $T_o$; one part leaves for production $P_B$, the other is evaporated in the distiller 2; the enthalpic content of the steam thus produced is distributed along the column; when this vapor reaches the head of the column at temperature $T_1$, it contains substance A at controlled purity; it is then condensed; a part of A is sent to production $P_A$, the other (reflux) is returned to the column. The arrow V shows the flow of vapor and the arrow L the flow of vapor in a section S (T) of the column and temperature T.

The physical operations involved are normally followed on the Merkel diagram; this diagram (FIG. 2) includes for each pressure:

the balanced zones, concentration x(T) liquid and y(T) vapor of substance A.

the enthalpic h (liquid) and H (vapor) of the mixture depending on the concentrations.

The correspondences between these magnitudes on the diagram are indicated in FIG. 2.

It is easy to convince oneself that the distillation thus produced cannot be reversible: by writing between two column sections the three conservation equations (flow rate A, flow rate A+B, enthalpic) it is perceived that they cannot all three be verified together; subsequently, in the conventional distillation with heat insulated columns, the liquid and vapor phases in contact necessarily evolve off balance.

The applicant has observed that to obtain the thermodynamic balance (i.e., the values of the concentrations of liquids x and vapor y corresponding to the balance at the pressures and temperatures considered), at all points, heat must be added or removed in each column section. French patent No. 80 17313 provides an example of the means that can be used to obtain reversible distillation.

The reversible distillation obtained thus is featured in this way in each specific case by a distribution of heat Q(t):

$$\int_{T_o}^{T} q\, dT$$

as shown typically in FIG. 3.

Q(T) contains several parts and notably:

part BC (exhaust E) expressing an endothermal activity of the column.

CD (rectification R) which is exothermal.

The portions BC and CD are both arcs of very taut curves which can be assimilated to straight lines, representative of exchanges with external heat-conveyance circuits with constant specific heat.

The reasoning that has been made above relating to a distiller column is applicable to all types of thermal exchanger, and in particular to a thermal system consisting for example of a packed or plate column equipped over the whole height with exchanges flowed through by external heat-conveyance circuits with sensible heat providing or extracting from the said column, the linearized heat distribution ensuring its reversible operating. A section of column equipped with an external heat-conveyance circuit with constant flow rate can be considered as an exchanger containing a first diphasic compartment, consisting of the column itself, the second compartment being flowed through by the external heat-conveyer fluid. This exchanger is referred to as heat transfer element.

It will be observed that through this exchanger the flow of energy of all the effluents remains constant depending on the temperature, to the nearest second order.

Below, thermal activity will be the term for the quantity of heat received or supplied in each thermal transfer element to ensure reversibility of the thermodynamic phenomena for each level of temperature T.

A thermal transfer element is defined by:
the nature of the diphasic mixture used
the flow rates of liquid and vapor working fluid in the first compartment
the operating pressure of the exchanger
the values of the temperatures between which the fluid evolves in the element.

The heating powers applied to the element are deduced from this (heat resources=heat contributed to the system, positive; heat uses=heat supplied by the system, negative) and subsequently the nature of the heat-conveyer.

A "reverse" heat transfer element, at another pressure, can be made to correspond to each given heat transfer element (said to be "direct"), at a given pressure, in which:
the nature of the diphasic mixture is the same as that of the heat-conveyer fluid
in the direct element and reverse element, with similar sections, the same liquid and vapor flow rates are to be found with the same concentrations of the working fluid components, but evolving in the reverse direction depending on the temperature.
the sources have the same absolute value for a direct and a reverse element, but the signs are opposite.

SUMMARY OF THE INVENTION

The aim of the invention is any heat transfer device in view of putting thermal resources and thermal uses into relation, in order to valorize the energy of the sources without reducing their energy content, the said device operating in a very similar fashion to reversibility with a working fluid consisting of at least two pure mixable substances used in diphasic form, featured in that it includes:

an initial direct assembly of heat transfer elements inserted serially on the liquid and vapor flows of the working fluid, the said initial assembly including an initial diphasic exchange column operating at an initial pressure value, a second heat transfer element assembly, the said second assembly being reverse of the first and containing the same number of elements and notably a second diphasic exchange column, the second column working to a second pressure value lower than the first value, the adventitious flows and their directions being adjusted so that the two columns receive at all points during the exchanges, the quantities of heat corresponding to their normal activity.

In a special method of construction, the machine includes a first and second column continuously covering a temperature area $T_oT_2$, without overlapping the respective temperature areas of the columns, the end areas of the columns being solely all the source of heat exchange with the outside, the areas at temperatures $T_o$ and $T_2$ exchanging in the same direction, the other end areas exchanging in the reverse direction.

In an industrial construction method corresponding to a single-stage trithermal heat pump, the machine is featured in that the first and second columns include at their hottest end respectively, a first distiller and a second distiller, and their coldest end respectively, a first and second condenser, the distillers receiving their heat from resources outside the device and the condensers supplying heat to a use point, the adventitious flows including:

an initial pair linking the combined ends of the first distiller and the second condenser and exchanging heat in a first counter-current exchanger, a second pair linking the combined ends of the second distiller and the first condenser and exchanging heat in a second counter-current exchanger, a third pair linking practically the center of the first column to the second condenser and exchanging heat in a third counter-current exchanger, and a fourth pair linking practically the center of the second column to the first condenser and exchanging heat in a fourth counter-current exchanger.

In an industrial construction method corresponding to an energy valorizing machine available at average temperature level, the first direct column contains at its hottest end a first condenser supplying energy to a use point, the second reverse column containing at its coldest end a second condenser supplying energy to the use point, the two columns each containing, at their common temperature, a distiller receiving heat from outside sources, the advantageous flows including:

a first pair linking the combined ends of the first distiller and the second condenser and exchanging heat in the first counter-current exchanger, a second pair linking the combined ends of the second distiller and first condenser and exchanging heat in a second counter-current exchanger, a third pair linking practically the center of the first column to the second condenser and exchanging heat in a third counter-current exchanger, and a fourth pair linking practically the center of the second column to the first condenser and exchanging heat in a fourth counter-current exchanger.

In another method of construction corresponding to a multi-stage machine, the first and second columns cover a temperature area $T_oT_{2g}$ with a common temperature area $T_1T_2$, the heat sources, positive or negative, applied to a column between two given temperature values induced in the other column, between the same temperatures, a heat of reverse sign.

In another method of constructing the machine, associating a worksource to it (positive via a compressor, negative by a turbine), the machine is featured in that at least one point of the column, located in an end section of a heat transfer element composing the said column, is linked to a vapor extraction circuit which conveys the vapor to the homologous point on the reverse column, the said circuit containing a mechanism bringing the pressure of the vapor from its value at the extraction point to its value at the point of reinjection into the said reverse column, the machine containing the means of establishing a liquid flow between the said vapor extraction and reinjection points, so as to obtain equality of the liquid flows in the homologous sections of the associated columns.

The invention will be clearly understood by the description given below of the various methods of producing it, referring to the drawing appended.

BRIEF DESCRIPTION OF THE DRAWINGS

FIGS. 19 and 20 show two diagrams of exchanges used in the machines in the invention.

FIG. 21 shows diagrammatically a trithermal machine receiving heat at high and low temperature levels and supplying heat at an intermediate level.

DESCRIPTION OF THE PREFERRED EMBODIMENTS

Figure 1:
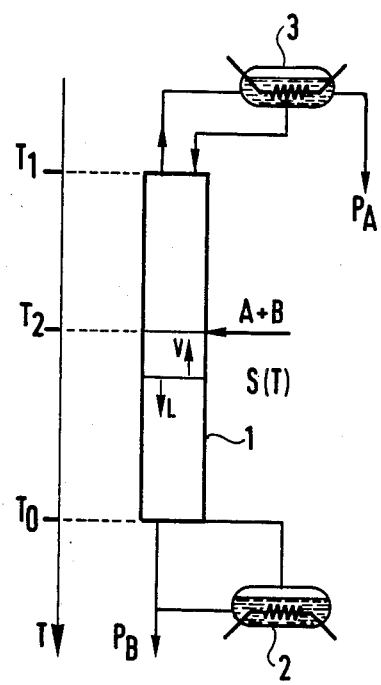
FIG. 1 shows diagrammatically a conventional distillation column.
Figure 2:
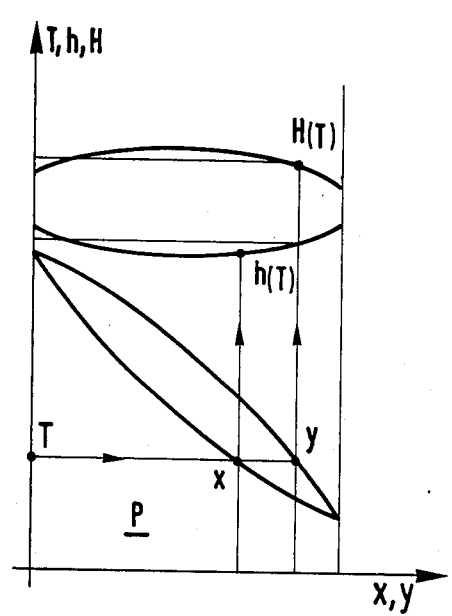
FIG. 2 shows a Merkel diagram for a binary mixture.
Figure 3:
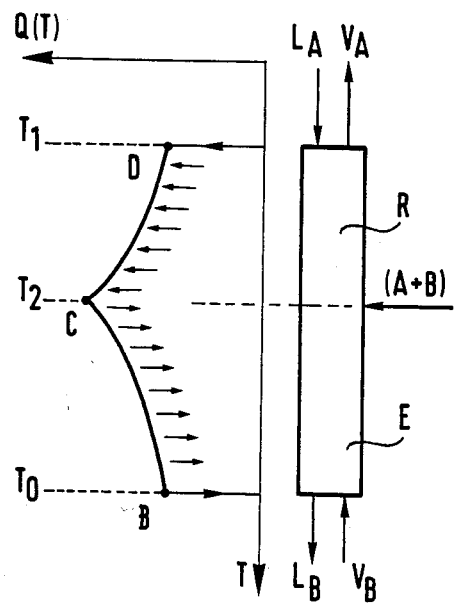
FIG. 3 illustrates the heat exchanges occurring in a distillation column carrying out a practically reversible process.

FIGS. 1 to 3 have already been commented on.

Figure 4:
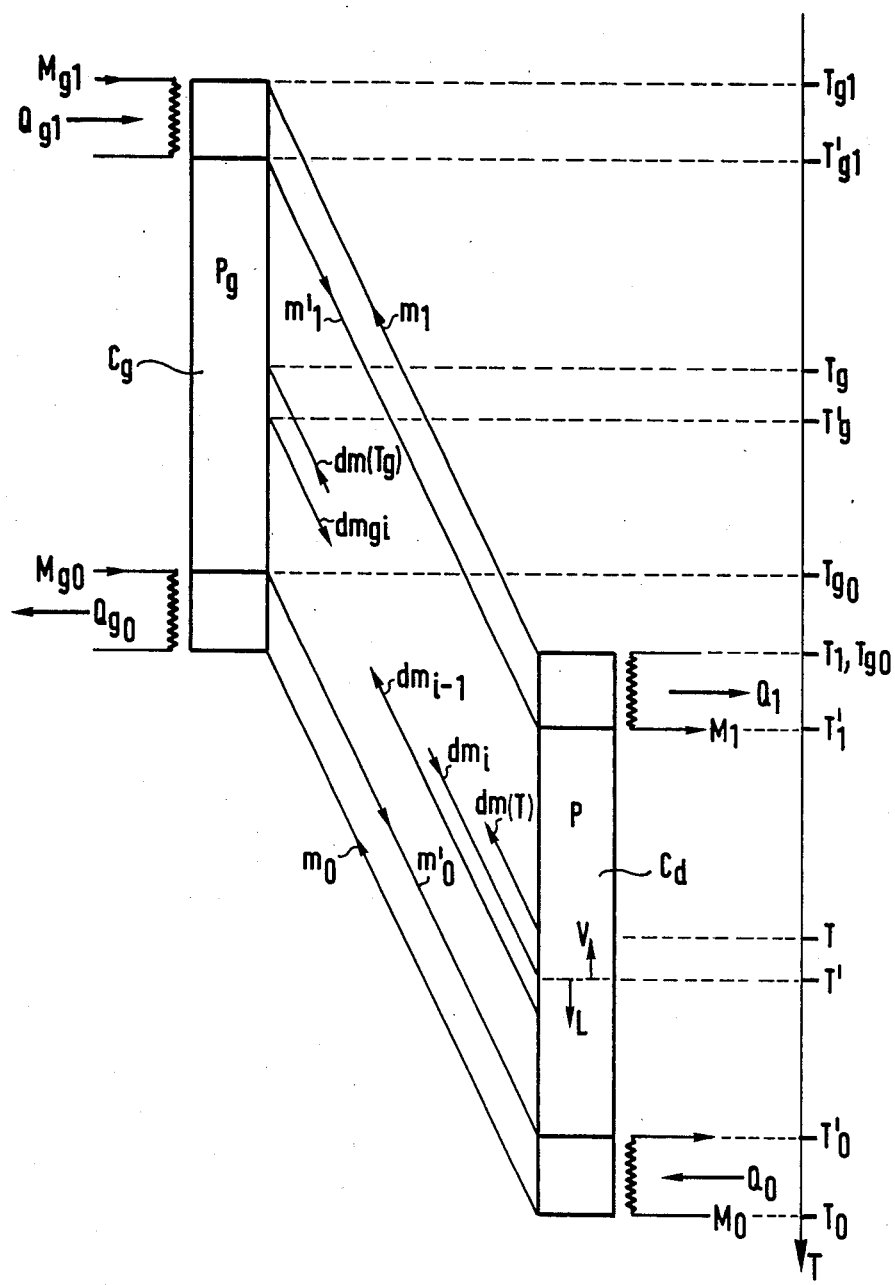
FIG. 4 is a basic diagram of a single-stage heat transfer system.

FIG. 4 shows diagrammatically a device according to the invention, in the so-called single-stage version. The device consists in the association of two diphasic contact columns (for example, plate or packed), where a working fluid is used according to the procedures specified below. The working fluid is a mixture of at least two pure mixable substances. In all that follows the explanation will be simplified by simply giving examples of binary mixtures. FIG. 4 should be read with the conventions below, applicable, apart from indications to the contrary, to all the thermal diagrams explained in this memorandum. The temperature axis T is directly towards the bottom of the drawing. In the columns the flows of liquid and vapor are designed by L and V. The values of the adventitious flows are indicated by the letter m with indices.

If an axis perpendicular to the axis of the temperature is traced, the temperature is the same for all the points intercepted by this axis whether points on the column, heat conveyer circuits or outside sources.

To obtain this condition the columns, heat conveyer circuits and outside sources (resources: counted positively and uses: counted negatively) exchange heat.

Returning to FIG. 4 it is noted that column $C_d$ to the right (high pressure P, high temp.) is a column to be distilled whose high temperature area between $T_o$ and $T_o'$ is a distiller receiving a quantity of heat $Q_o$ from the outside (for example a heat-conveyer $M_o$), and from which liquid flow $m_o$ is extracted at $T_o$.

The low level area is a condenser which rejects to the outside a heat $Q_1$ between $T_1$ and $T_1'$ (for example to a heat conveyer $M_1'$) and from which a condensate flow $m_1$ is extracted at $T_1$.

This column contains right throughout its temperature area $T_oT_1$, a distribution of elementary working fluid extraction or injection flows dm (adventitious flows) which exchange their sensible heat with a column; by construction the adventitious flows are adjusted so that the exchanges with the corresponding columns correspond at all points to the supply of a quantity of heat equal to the thermal activity of the column. The dm are determined as follows:

The calculation is made step-by-step towards the decreasing temperatures starting from $T_o$. Let us assume that at one stage in the calculation we have obtained T', we therefore know L'V' and all the dm calculated between $T_o$ and T', let us write the equations for the elementary calculations step T'T (two flow conservation equations, enthalpy conservation).

$$L'-V+\Sigma dm_i = L-V+\Sigma dm_i + dm(T)$$

$$x'L'-y'V'+\Sigma x_i dm_i = xL-yV+\Sigma x_i dm_i + ndm$$

$$h'L'-H'V'+\Sigma h_i m_i = hL-HV+\Sigma h_i dm_i + hdm + dq.$$

As the liquid and the vapor are, by assumption, balanced between T and T', the thermodynamic magnitude (x, y, h, H) are known, dq is the influx of external heat and is a data; we therefore have three linear equations with L, V, dm as unknown factors, it is therefore possible to solve step-by-step from $T_o$ to $T_1$; the column thus obtained is strictly reversible.

It should be noted that the practice of the calculation indicate that the sections of type $T_o$ or $T_1'$ which are at an extreme limit between an exchange area, and an adiabatic area, receive advantageous flows of finite values. The left hand column Cg (distiller between $Tg_o$ and $T'g_o$, condenser between $T'g_1$ and $Tg_1$, flow of heat conveyers $Mg_o$, $Mg_1$) is the reverse column to the right hand column. This term reverse is explained further on. It is observed that the arrangements adopted for the right hand column confer fully reversible operating on it.

The left hand column is at lower pressure Pg and subsequently at lower temperature; it receives in reverse direction the advantageous flows from the right hand column in homologous sections where the same liquid concentration prevails with balance. It contains the same general operating characteristics as the first column notably so far as concerns exchanges with the dm.

The mass exchanges involve, on arrival, of a dm in a section of same concentration, same temperature.

The heat exchanges take place at constant temperatures. In the single-stage machine that we are examining at present, the pressure Pg is established so that $Tg_o=T_1$. Thus, both columns continuously cover the temperature area $T_oTg_1$; one single column is to be found at each temperature.

Cg will be the reverse column of $C_d$ if all the "flow" type magnitudes (flow rates, heat exchanges, etc.) are equal and of oppsoite sign in all homologous sections. Let us examine in what conditions Cg is effectively the reverse column of $C_d$.

For this purpose let us write the equations for the section T'gTg homologous of T'T $$L'g-V'g+\Sigma dmg_i = Lg-Vg+\Sigma dmg_i + dmg(Tg) \tag{1}$$

$$x'gL'g-y'gV'g+xg_idmg_i = xgLG-ygVg+xg_idmg_i+xgdlg(Tg) \tag{2}$$

$$h'gL'g-H'gV'g-hg_idmg_i = hgLg-HgVg+hg_idmg_i+hgdlg(Tg)+dqg \tag{3}$$

dqg is the influx of external heat. Cg will be the reverse of C if the whole section at temperature Tg is reverse to its opposite number at temperature T. It is assumed that the section T'g is reverse to T':

$$L'g=L', \quad V'g=V', \quad dmg_i=dm_i$$

The section Tg will be the reverse of section T if the solutions Lg, Vg, dm (tg) of the system (1)+(2)+(3) are such that Lg=L, Vg=V, dm(Tg)=dm(T).

In order for this to be so we must obtain:

Conditions 1 yg: y

Hg=H+Δ hg=H+Δ, Δ being an arbitrary magnitude.

Condition 2 dqg=dq

Conditions 1 mean that the Merkel diagrams established for pressures Pg and P are deducted from one another by a translation. This property is almost obtained in practice for most of the mixture diagrams, although not strictly so; it is to a certain extentan "extreme limit property" similar to the concept of perfect gas; we shall state that in this case the Merkel diagram is ideal (from our standpoint).

Finally it can be seen that the association of two columns as described above can only produce strictly reversible operating in an ideal Merkel diagram.

Condition 2 is interpreted as follows:

If heat is provided to a column with a given distribution, the development of a "heat requirement" is aroused in the second column along a reverse distribution, that we should term "induced heat".

Thus, in FIG. 4, influx of heat $Q_o$ along area $T_oT'_o$ by a heat conveyer $M_o$ induces a heat of the same value $Qg_o=Q_o$ between $Tg_o$ and $Tg'_o$, which should be extracted at use point; likewise the influx $Qg_1$ between $T'g_1$ and $Tg_1$ induces heat $Q_1=Qg_1$ between $T'_1$ and $T_1$ that must also be exhausted. It can be observed that one can also consider $Q_o$ as induced by $Qg_o$, and that this is indeed a coupling between heat conveyers $M_o$ and $Mg_o$.

The property just described is considered as essential, for this reason the machines deriving from this principle are referred to as "thermal induction machines".

Further properties can still also be obtained from these systems:

(1)

$$\text{On a } Q_1 - Q_o = \Sigma\ hi(T_1)mi \quad d'ou\ Q_1 \simeq Q_o$$
$$Q_o = Qg_o$$
$$Q_1 = Qg_1$$

$$COA = \frac{Qg + Qg_o}{Q_o} \simeq 2$$

$$\left(COA = \text{amplitude coefficient} = \frac{\text{heat at use point}}{\text{heat at hot source}}\right)$$

Figure 5:
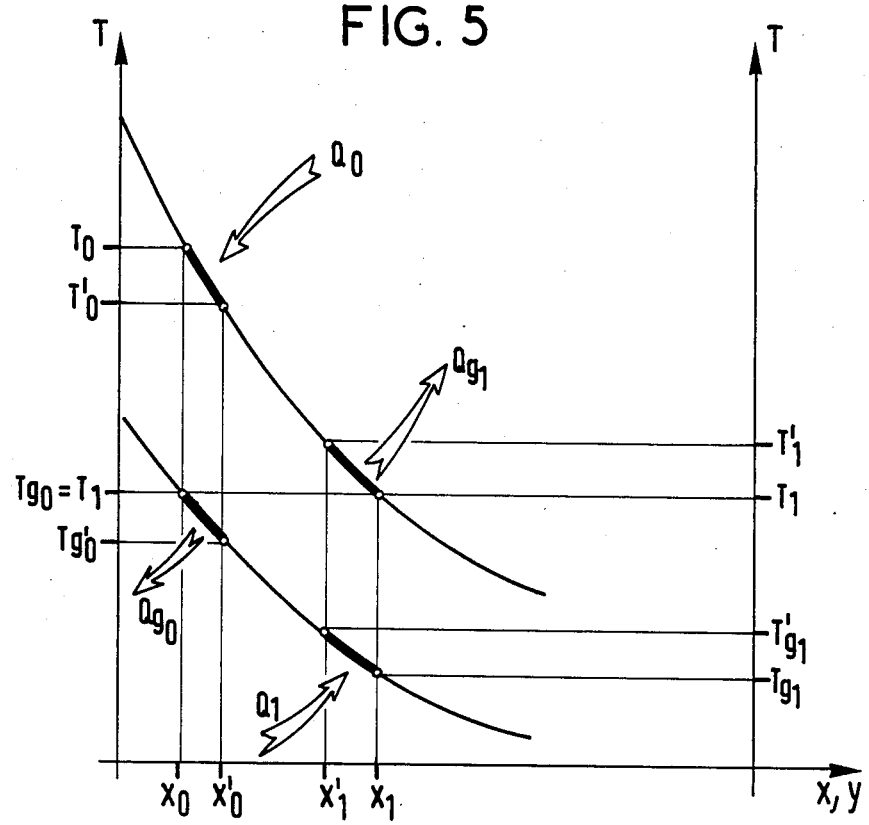
FIG. 5 is a Merkel diagram relating to the device in FIG. 4.
Figure 6:
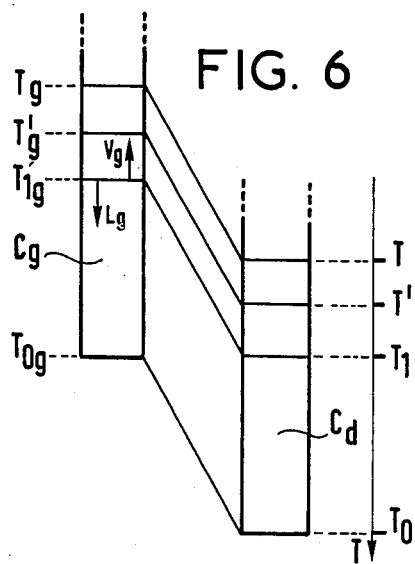
FIGS. 6 to 10 are basic diagrams explaining the operating of a multi-stage induction type heat transfer device.

(2) The position of the use point in relation to the sources results from the construction (FIG. 5) on the Merkel diagram; it is rigid and only this position provides for reversible operating; it is therefore necessary to consider it as a sort of nominal point; the study of the operating outside the nominal point will have no meaning in connection with real machines The multi-stage devices are those where the two columns, continuing to operate in the same way as above, can have a common temperature interval (FIG. 6).

When one undertakes to calculate this system step-by-step starting from $T_o$, one must decide, as from $T_1$, on a different procedure to the one described above.

Let us place ourselves at the calculation stage at a temperature T located in an area common to both columns. Let us assume that the adventitious flows up to T' have been already calculated for the right hand column; the left hand column is already provided up to T'g. To calculate the T T' section, we must now write:

Two flow equations for the left hand column (Lg, Vg unknown factors).

Two flow equations for the right hand column (L, V, dm(T) unknown factors).

The enthalpy equation for the whole of the system comprised between T and T', i.e., both columns and all the adventitious flows. I.e., five linear equations, five unknown factors, it is therefore possible to find the solutions step-by-step (structures of flows L, V, Lg, Vg, dm).

With this procedure we lose sight of how the exchanges occur between the column and zones of dm. We shall now seek to throw light on this point.

To succeed in doing so, we should endeavor to identify in the multistage system in FIG. 6, the single-stage systems which are its components.

Figure 7:
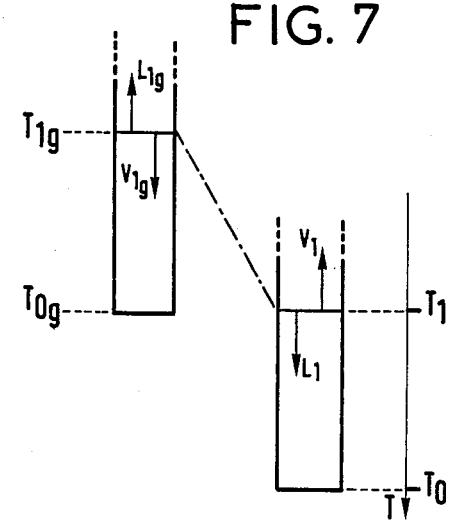
Figure 8:
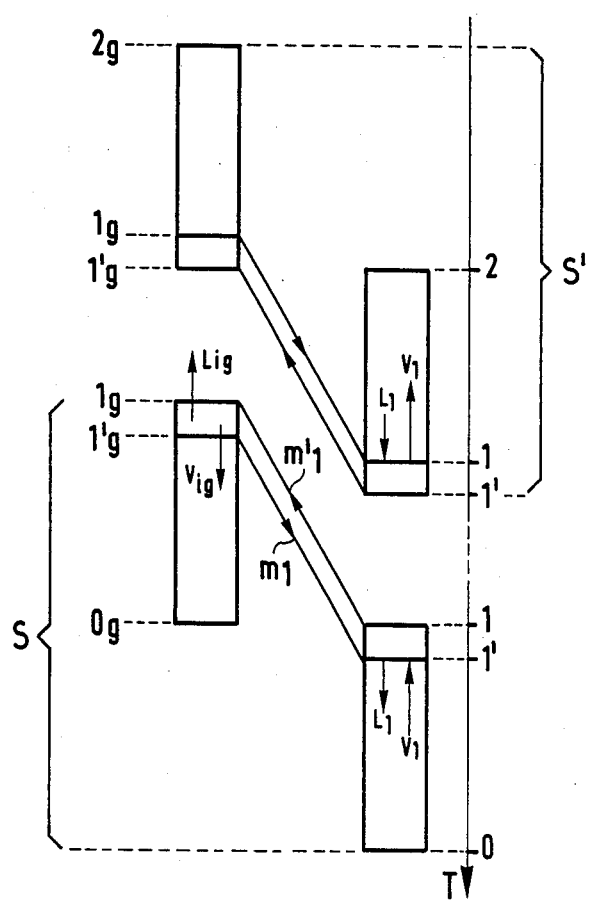

For this purpose, a break is made in the system according to FIG. 7, breaking off the continuity of the flows $L_1$, $V_1$, $L_{1g}$, $V_{1g}$, and we install on the limits of the two systems S and S' thus formed in 1, 1', 1g, 1'i g, condensers and evaporators, and we reclose the liquid flows $m_1$, $m'_1$ between homologous columns (FIG. 8). By assumption 1, 1', 1g, 1'g are very slight differences in temperature; the exchanges located on either side of the break (condensers and evaporators 1, 1', 1g, 1'g) have reverse operating. If the break is closed, we reobtain FIG. 6. If it is maintained, we see S and S' operate in the same way (structure of flows L, V, Lg, Vg, dm, identical except for the appearance of flows $m_1$, $m'_1$).

From the point of view of heat exchanges with the columns, the flows $m_1$ and $m_1^*$, are equivalent to: $m_1^* = m_1' - m_1 = L_1 - V_1$ (FIG. 9).

In the system S, $m_1^*$ heats the column Og1g associated to it; in system S', then column 1'2 heats $m_1^*$.

Figure 9:
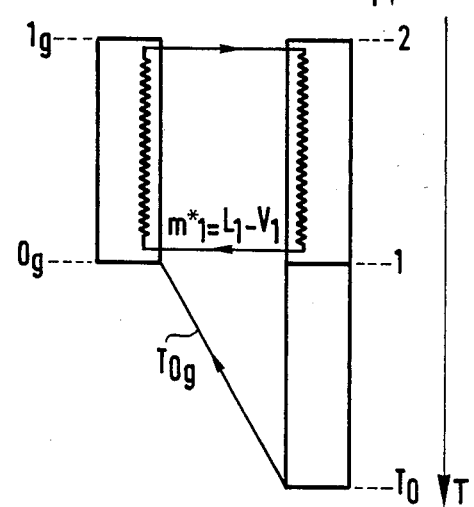

If we return to the initial system closing the break, all the elements in our instructions disappear; the fact remains that the fictitious existence of the preceding flows $m_1^*$ revealed a transfer of heat from column 12 to column to Og1g, equivalent to the circulation in closed circuit of the heat conveyer, $m_1^* = L_1 - V_1$ (see FIG. 9).

The reasoning that we have just shown is independent of everything that happens elsewhere in the system and notably:

Column 01 is certainly provided with a heat source; we should therefore necessarily find on column Og1g the distribution of induced heat. There will be a choice between:

Supplying it directly to a use point.

Transferring it to the column opposite between the same temperatures; in this case this distribution of heat will be induced again on the left hand column and so on.

The multi-stage machines are constructed by a method whose rules will be specified when terminating the machine that has been commenced.

Figure 10:
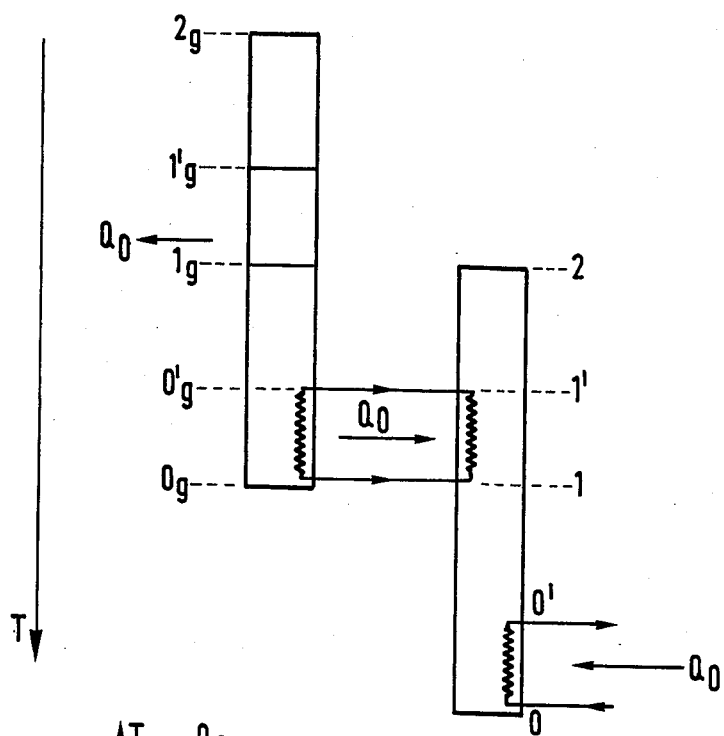

As from the initial sections 01, (FIG. 10), many things are already determined and notably:

the reverse section Og1g.

the direct section vis-a-vis 12.

Figure 11:
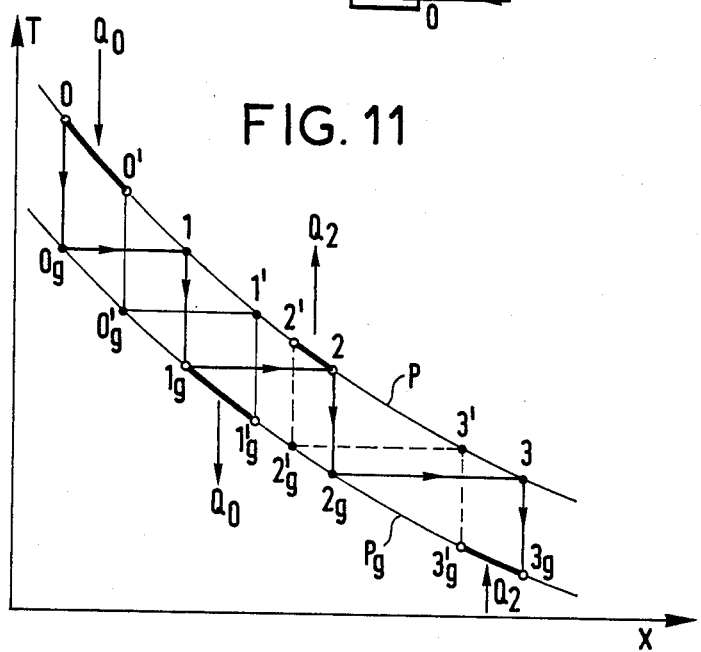
FIG. 11 is a Merkel diagram of a multi-stage, induction-type heat transfer device.

They are constructed on the Merkel diagram like stair steps between the curves x(T) corresponding to pressures P and Pg (FIG. 11).

Sill following this stepped construction the distribution of heat $Q_o$ can be represented along 00' by a sequence of inductions and exchanges vis-a-vis until finally it emerges from the left hand column (for example in 1g 1'g.)

Likewise $Q_2$ entered in 3g 3'g will emerge from C in 22'; the system is quadthermal; to make it triethermal the steps must be provided so that $Q_o$ and $Q_2$ emerge from the system in the temperature area prescribed for the use point.

Until now only theoretical machines have been described.

We shall now describe various methods of constructing real machines. The real machines are distinguished from the theoretical ones by the two following points:

the Merkel diagrams of the fluids used in the real machines are not perfect ones.

the number of adventitious flows is finite.

Real trithermal machines have been designed, via numeric programs, in which the liquid and vapor evolve slightly off balance to enable the enthalpic balances to be satisfactory.

The result is a slight difference between the real COA and the theoretical COA (in the example below 1.91 instead of 1.95).

Figure 12:
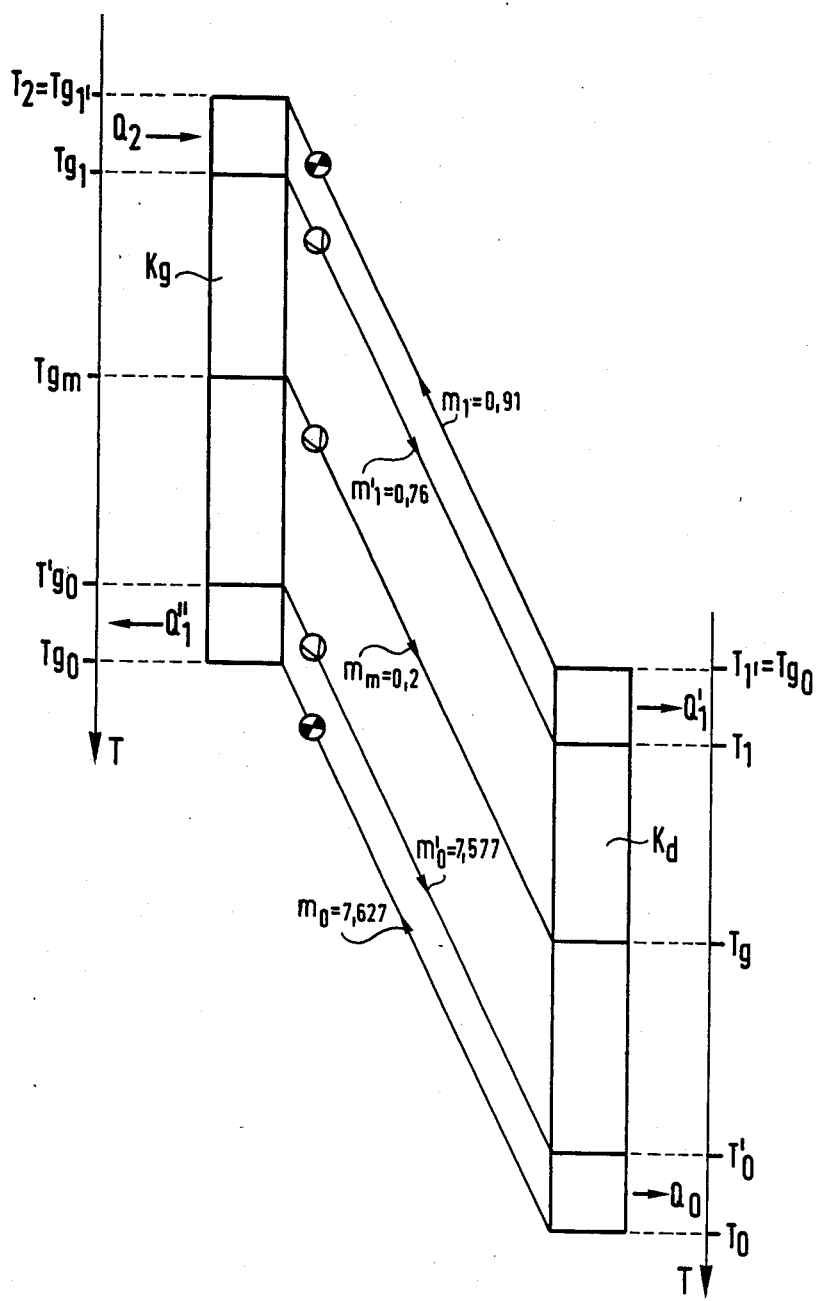
FIG. 12 shows diagrammatically a single-stage thermal induction machine in the first method of construction.
Figure 13:
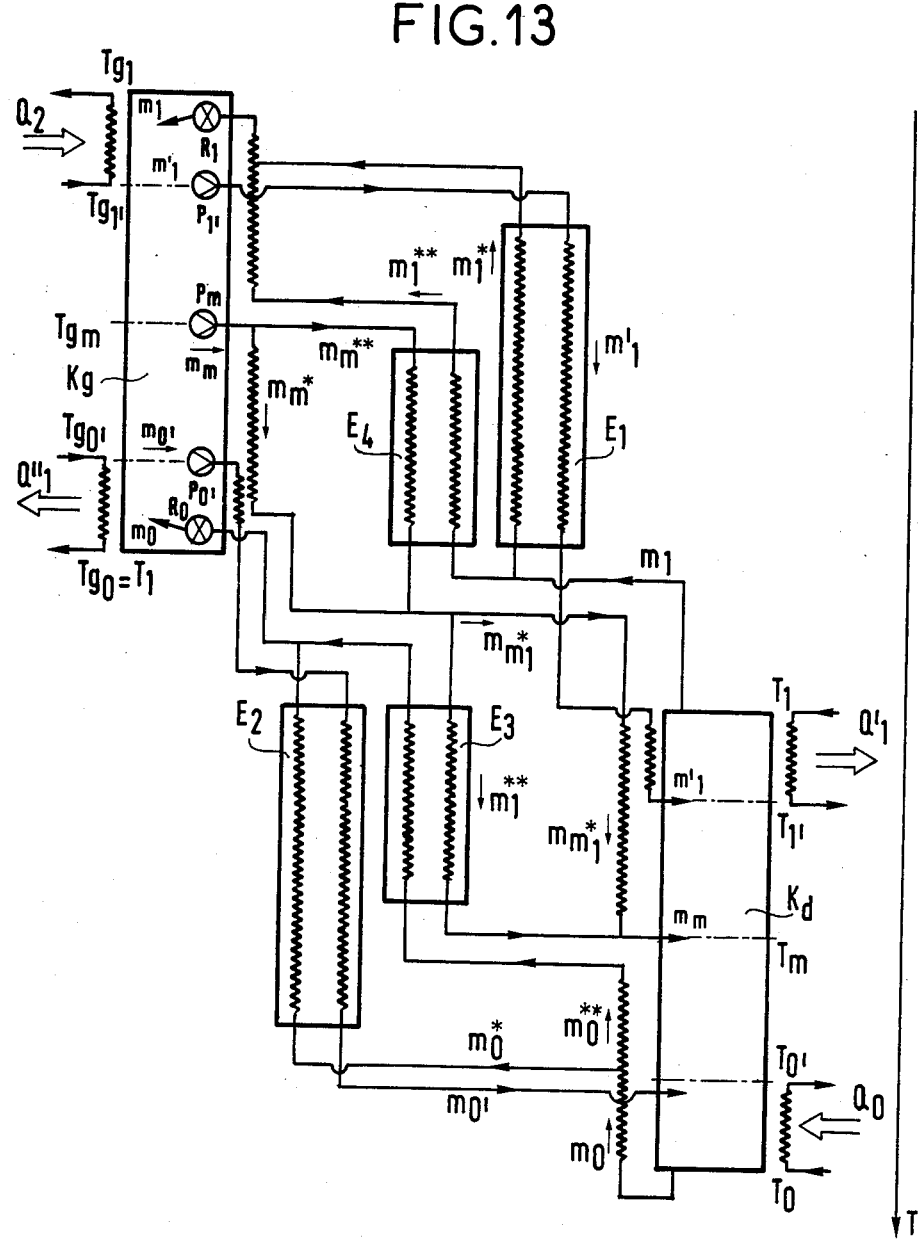
FIG. 13 is a more detailed diagram of the machine in FIG. 12.
Figure 14:
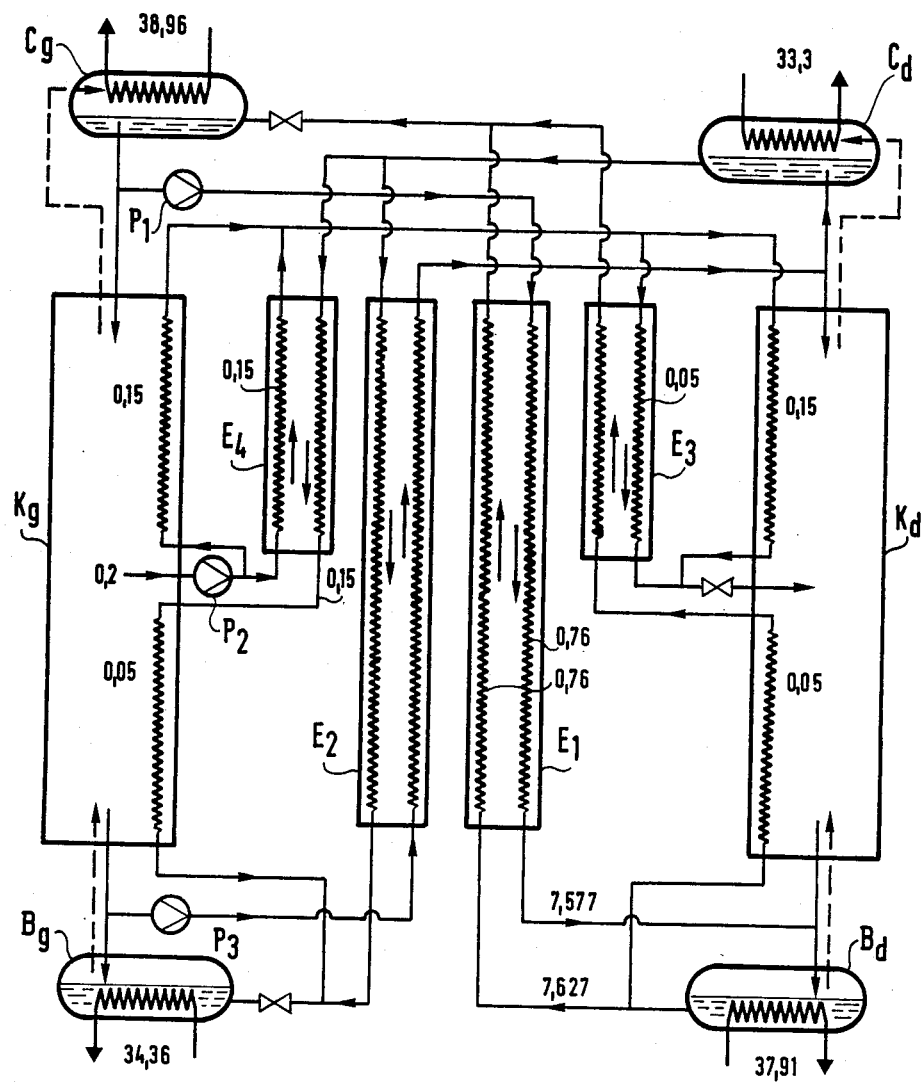
FIG. 14 shows still more details of the machines in FIGS. 12 and 13.

The real machine, in its conventional mode, is shown in FIG. 12, and more in detail in FIG. 13, whereas FIG. 14 shows it in the real construction configuration.

FIG. 12

The machine includes a column Kd and a column Kg, operating with a mixture of R113 and R114.

The column Kd receives heat $Q_o$ between temperatures $T_o$ and $T'_o$ and supplies heat $Q'_1$ between $T'_i$ and $T_1$.

Column Kg supplies heat $Q''_1$ between $Tg_{go}$ ($=T'_1$) and $T'g_o$ ($=T_1$) and receives heat $Q_2$ between temperatures $T'g_1$ and $Tg_1$.

There are five adventitious flows: the first flow $m_o$, from Kd and $T_o$ to Kg at $Tg_o$ exchanging heat at $\Delta T$ constant with a second flow $m'_o$ from Kg at $T'g_o$ to Kd at $T'_{oi}$.

A third flow $m_1$ from Kd at $T_1$ ($=Tg_o$) to Kg at $Tg_1$ exchanging heat with a fourth flow $m'_1$ from Kg at $T'g_1$, a fifth flow $m_m$ from Kg at Kd exchanging heat with Kg from $Tg_m$ to $Tg_1$ and with Kd from $Tg_o$ ($=T_1$) at Tg, $Tg_m$ and Tg being practically intermediate temperatures of columns Kg and Kd.

FIG. 13

FIG. 13 explains this diagram (FIG. 12) highlighting the components which produce the thermal exchanges. The convention relating to the axis of the temperature remains. It can be seen that it is necessary to use four exchanges $E_1$, $E_2$, $E_3$, $E_4$.

The notations indicate that:

the flow $m_o$ is doubled in $m_o^*$ and $m_o^{**}$ the flow $m_m$ is doubled in $m_m^*$ and $m_m^{**}$ then $m_{m1}^*$ and $m_{m1}^{**}$ the flow $m_1$ is doubled in $m_1^*$ and $m_1^{**}$ with $m_o^* = m'_o$
$m_o^{} = m_1^{}$
$m_m^{} = m_1^{}$
$m_1^* = m'_1$.

Each exchanger is counter-current type and works at a constant temperature difference at each point.

Pumps $P_1$, $P_2$, $P_3$ circulate the fluids.

FIG. 14

FIG. 14 shows, with its components on legs, the trithermal machine shown diagrammatically in FIGS. 12 and 13. The conventions relating to the temperature and gravity axes are abolished and replaced by classical representation conventions.

The portions of columns exchanging heat with the outside have been isolated, i.e.:

a distiller $B_D$ and a condenser $C_d$ on column $K_d$
a distiller $B_g$ and a condenser $C_g$ on column $K_g$.

Column $K_d$ is at high pressure (five bar) whereas column $K_g$ is at atmospheric pressure.

The numerical indications alongside the distillers and condensers correspond to the exchange of heat with the outside expressed in kilowatts.

The black arrows indicate the liquid flows in liters per second.

The dotted line arrows show the vapor flows.

The operating temperatures are as follows:

$T'_o$ on entry to distiller $B_d = 85.83°$ C.
$T_o$ on outlet from distiller $B_d = 86.33°$ C.
$T'_1$ on entry to condenser $C_d = 60.89°$ C.
$T_1$ on outlet from condenser $C_d = 60.39°$ C.
$Tg_o = T_1$ on entry to distiller $B_g = 60.39°$ C.
$T'g_o$ on outlet from distiller $B_g = 59.89°$ C.
$T'g_1$ on inlet to condenser $C_g = 34.94°$ C.
$Tg_1 = T_2$ on outlet from condenser $C_g = 34.54°$ C.

It can be observed that the differences in temperature at the end of the thermal exchange element with the outside (distillers, condensers) is around 0.5°. Thus conventional distillers and condensers are used.

The internal exchanges in the machine, involving the working fluid of the following:

Exchanger $E_1$: 215 kW
Exchanger $E_2$: 20 kW
Exchanger $E_3$: 0.7 kW
Exchanger $E_4$: 2.04 kW
Column $K_d$: 2.84 kW
Column $K_g$: 2.57 kW
Use point (condenser $K_d$ and $K_g$): 72 kW In this example the thermal exchanges are three times higher than the power used, but the exchanges with the columns are very low (around 7%).

It can be seen that the trithermal induction machine consists of an assembly of several types of subassemblies
    conventional mixture distillers and condensers
    liquid-liquid counter-flow exchangers in which the liquid working fluid circulates
        accessories such as liquid pumps and throttles
        devices consisting of contact columns equipped with exchangers. These devices in fact consist of the serial juxtaposition on the liquid and vapor working fluid, of thermal transfer elements that we have described at the start of this memorandum in its principles. We shall describe these elements further on from the aspect of their technological method of construction.

Figure 15:
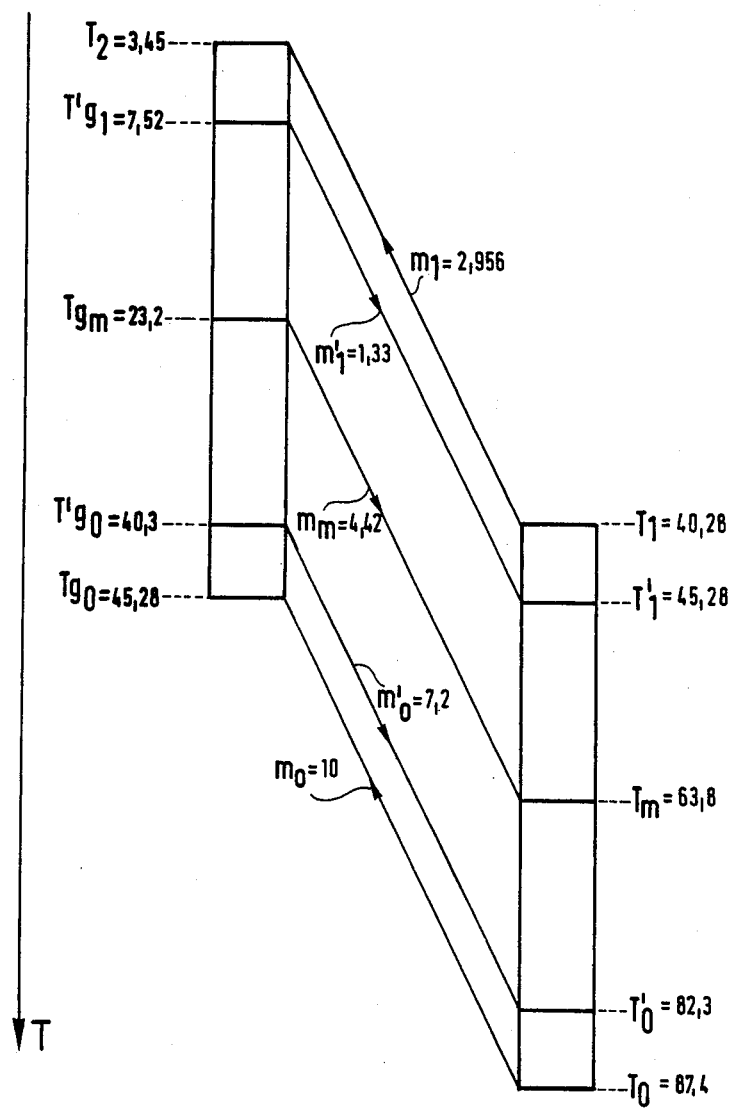
FIGS. 15 and 16 are two diagrams of a single-stage thermal induction machine according to a second method of construction.
Figure 16:
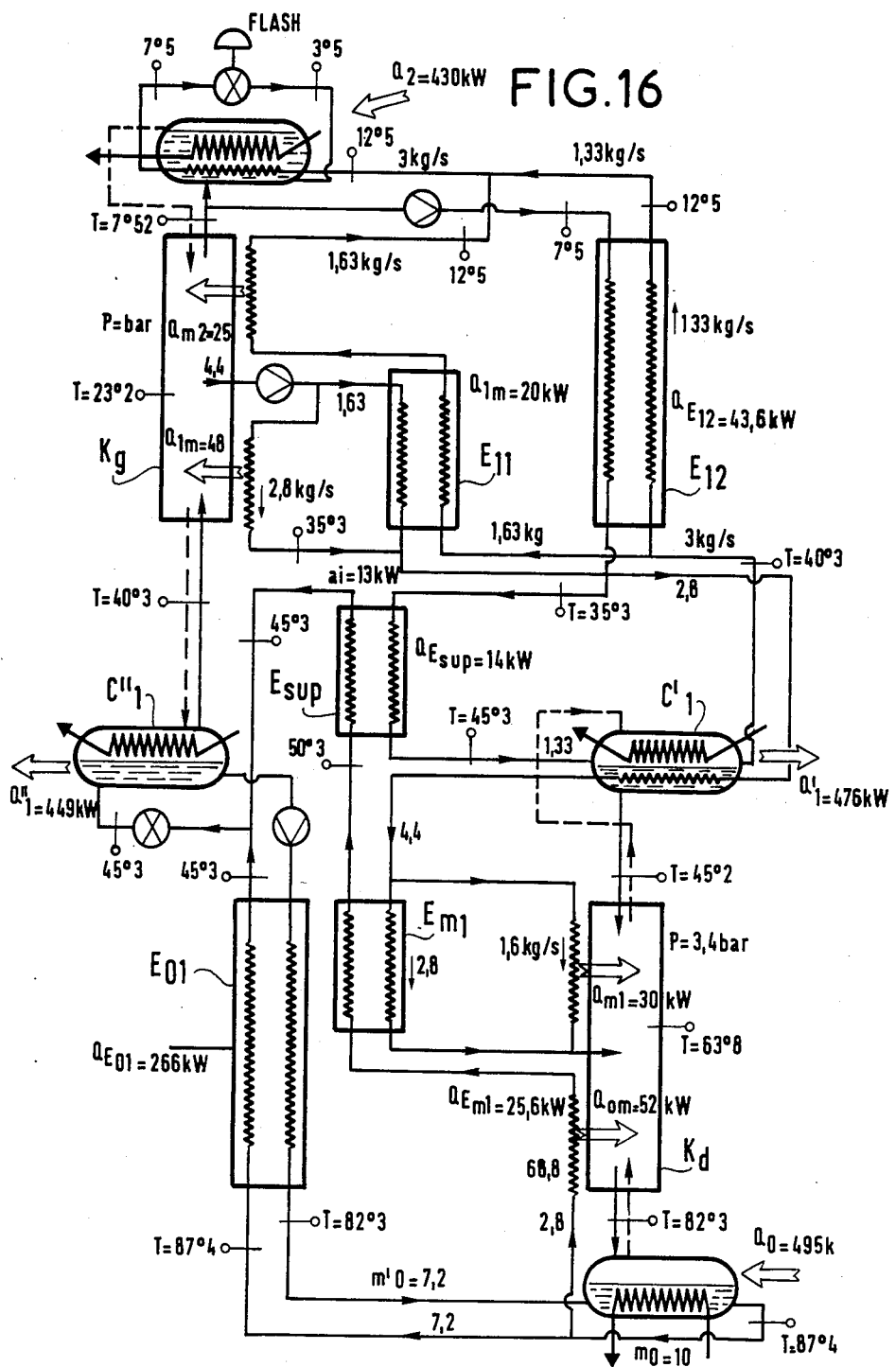

FIGS. 15 and 16 are two diagrams of an alternative version of the machine.

In these two figures the conventions relating to a single temperature axis facing downwards and toward the gravity axis are used again.

FIG. 15 shows that:

the differences in temperatures of the distillers and condensers is 5° C. approx.

the same number and same arrangements have been preserved for the adventitious flows.

FIG. 16 is a conventional and more detailed one in which the exchange $\Delta T$ of the various exchangers is involved.

We find the distillers, condensers and exchangers in FIG. 14, but with the following notations: $E_{01}$, $E_{12}$, $E_{m1}$, $E_{1m}$.

Moreover we add to the machine:
a low power exchanger $E_{sup}$
a flash F on entry to distiller $B_g$.

In fact, in the upper temperature part of the cycle, the exchange $\Delta T$ in exchanger $Q_{eo1}$ is equal to the temperature interval of distiller $T_o - T'_o$. In the same way the exchange $\Delta T$ for the whole of the high level cycle organize themselves. At low temperature, the situation of the exchangers is reversed, because the heating exchanger compartment is at a temperature less than that of the heated compartment.

This situation is corrected by using an additional (low power) exchanger and obtaining a small 5° C. flash of working fluid which enters into distiller Bg.

The powers exchanged are:
in exchanger $E_{01}$: 266 kW
in exchanger $E_{12}$: 43.6 kW
in exchanger $E_{n1}$: 25.6 kW
in exchanger $E_{1m}$: 20 kW
in exchanger $E_{sup}$: 14 kW
in column $K_d$: 82 kW
in column $K_g$: 73 kW
at the use point (Cd+Cg): 449+476 kW = 925 kW The internal exchanges by liquid-liquid exchangers correspond to about 40% of the useful power; the exchanges in the columns correspond to about 17% of the useful power.

These two examples show how and with what order of the magnitude the temperature interval of the external surfaces operate on the internal exchanges:

When we get close to the isothermal exchanges ($\Delta T$ small), the internal liquid-liquid exchanges become very considerable as compared to the thermal power of the system qt the same time as the exchanges with the diphasic columns become evanescent.

With $\Delta T = 5°$, the internal liquid-liquid exchanges are slight, nevertheless the exchanges with the columns are not yet prohibitive and appear possible with the existing technological facilities.

Figure 17:
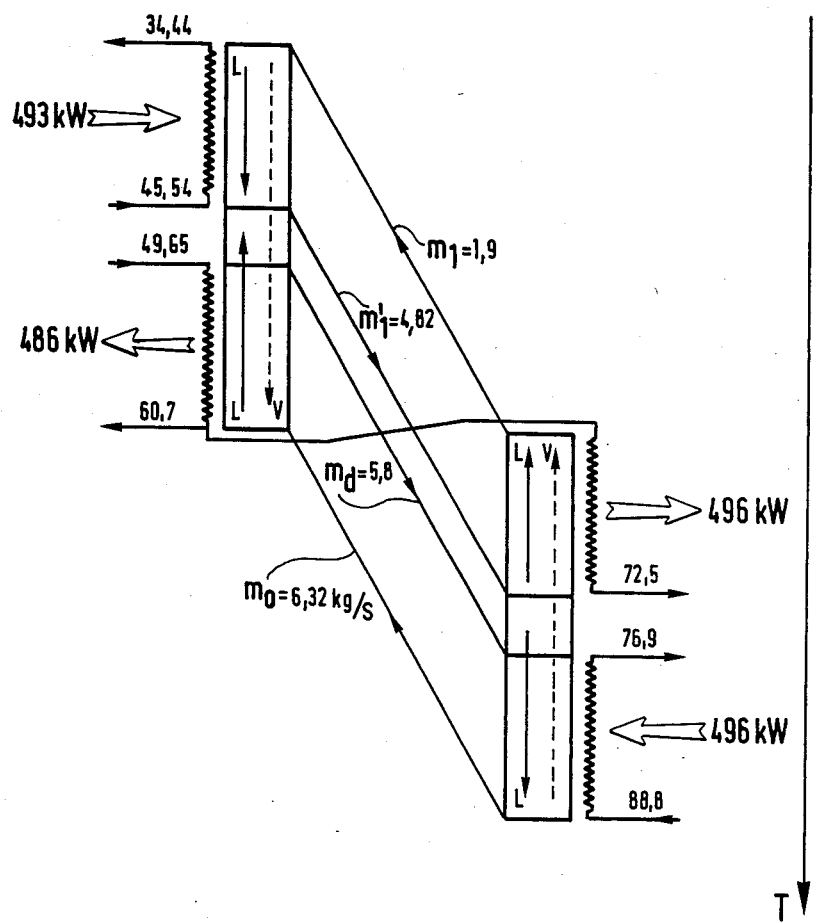
FIGS. 17 and 18 are two diagrams of a single-stage thermal induction machine according to a third method of construction.
Figure 18:
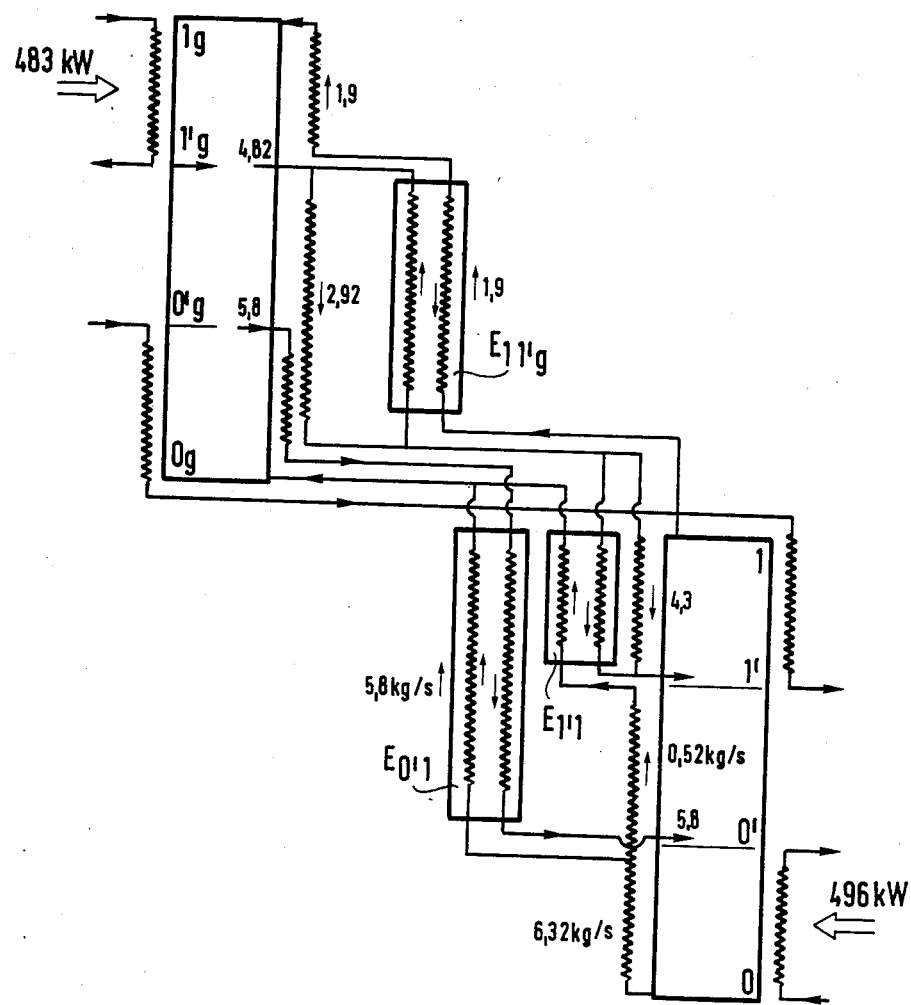

FIGS. 17 and 18 illustrate another example of a machine in which the heat sources exchange with the outside, with a high difference in temperature (around 11° C.) We note:

that there are now only four adventitious flows; the one termed $m_m$ in the previous examples has become useless.

the two columns $K_d$ and $K_g$ include considerable co-current sections, so that the system seen on legs would contain four columns.

The explicit diagram displays three liquid-liquid power exchangers:
$E_{o'1} = 93.96$ kW
$E_{1'1} = 6.13$ kW
$E_{11'g} = 28.8$ kW Hence in all 195 kW, value now become low as compared to the useful power 982 kW.

Let us examine the exchanges with diphasic columns along the different transfer elements:

| | | | |
|---|---|---|---|
| 00' | with the working fluid | 75.2 | kW |
| | with the external heat conveyers | 496 | kW |
| | | 571.2 | kW |
| 0'1' | with the working fluid | 2.28 | kW |
| 11' | with the working fluid | 50.74 | kW |
| | with the heat conveyer fluid | 496 | kW |
| | | 549 | kW |
| og og' | with the working fluid | 96.3 | kW |
| | with the heat conveyer | 486 | kW |
| | | 582.3 | kW |
| o'g 1'g | with the working fluid | 12 | kW |
| | with the heat conveyer fluid | 21 | kW |
| 1'g 1g | with the working fluid | 481 | kW |
| | | 514 | kW |

Lastly 2281 kw are exchanged directly with the diphasic column whereof 1971 with the external heat conveyers, 310 with the working fluid.

The following conclusions will be noted:

The exchange temperature intervals with the outside sources confer certain contrasting characteristics on the technology of the machines.

The machines exchanging with isothermal sources on relatively conventional distillers and condensers also comprise:
large scale liquid-liquid exchanges
small size exchanges in the columns.

The machines exchanging with sensible heat conveyers comprising quite preponderant heat conveyor—column exchanges.

To these two types of machine must be added different technological solutions for exchanges between column and heat-conveyers.

The machines exchanging with isothermal sources a column obtained as per the diagram in FIG. 19 can be used.

It includes a conventional packing G (Raschig rings for example); the heat conveyers circuit $C_c$ contains a succession of horizontal coils such as five, placed at different discrete levels.

For the machines exchanging with sensible sources, requiring a larger exchange, it is preferable to use an exchanger as that in FIG. 20.

The diphasic fluid circulates in the tubes T provided with a packing and a helical spring; the heat conveyer fluid circulates between the tubes. Thus a maximum exchange surface is obtained with a very low pressure drop.

The three examples of construction given as reference in FIGS. 12 to 14, 15 and 16, 17 and 18 respectively concern single-stage machines in which energy is supplied at high temperature levels, the energy is extracted at a low temperature level source (such as water sheet) and energy obtained at intermediate temperature.

The diagram in FIG. 21 shows a trithermal machine receiving the thermal energy $Q_{i1}$, $Q_{i2}$ at an intermediate temperature $T_1$, $T'_1$, $T_1$, $T'_{go}$ and supplies calories $Q_h$ at high temperature level $T_o$, $T'_o$ whilst rejecting the energy $Q_b$ at a low temperature level $T_2$, $T'_2$. Thus results in the perfect reversibility of the machine and thermal induction properties existing in both possible operating directions.

Figure 22A:
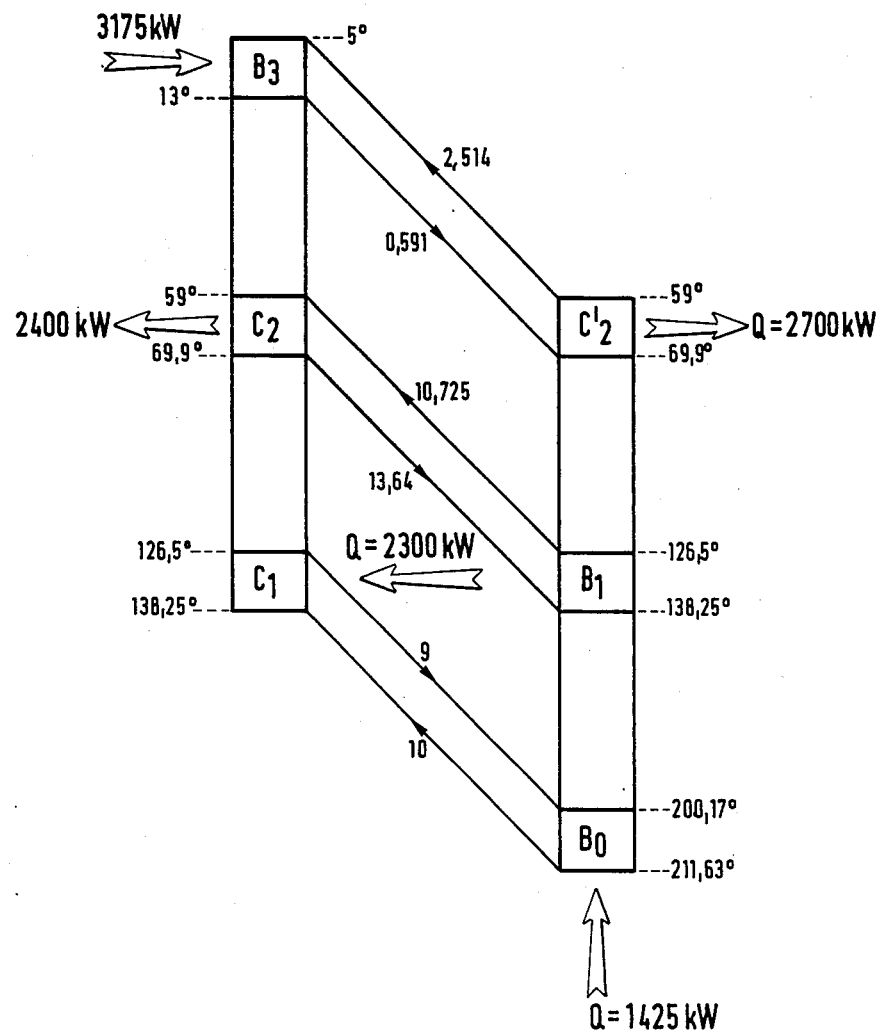
FIGS. 22A and 22B show diagrammatically a single-stage machine.
Figure 22B:
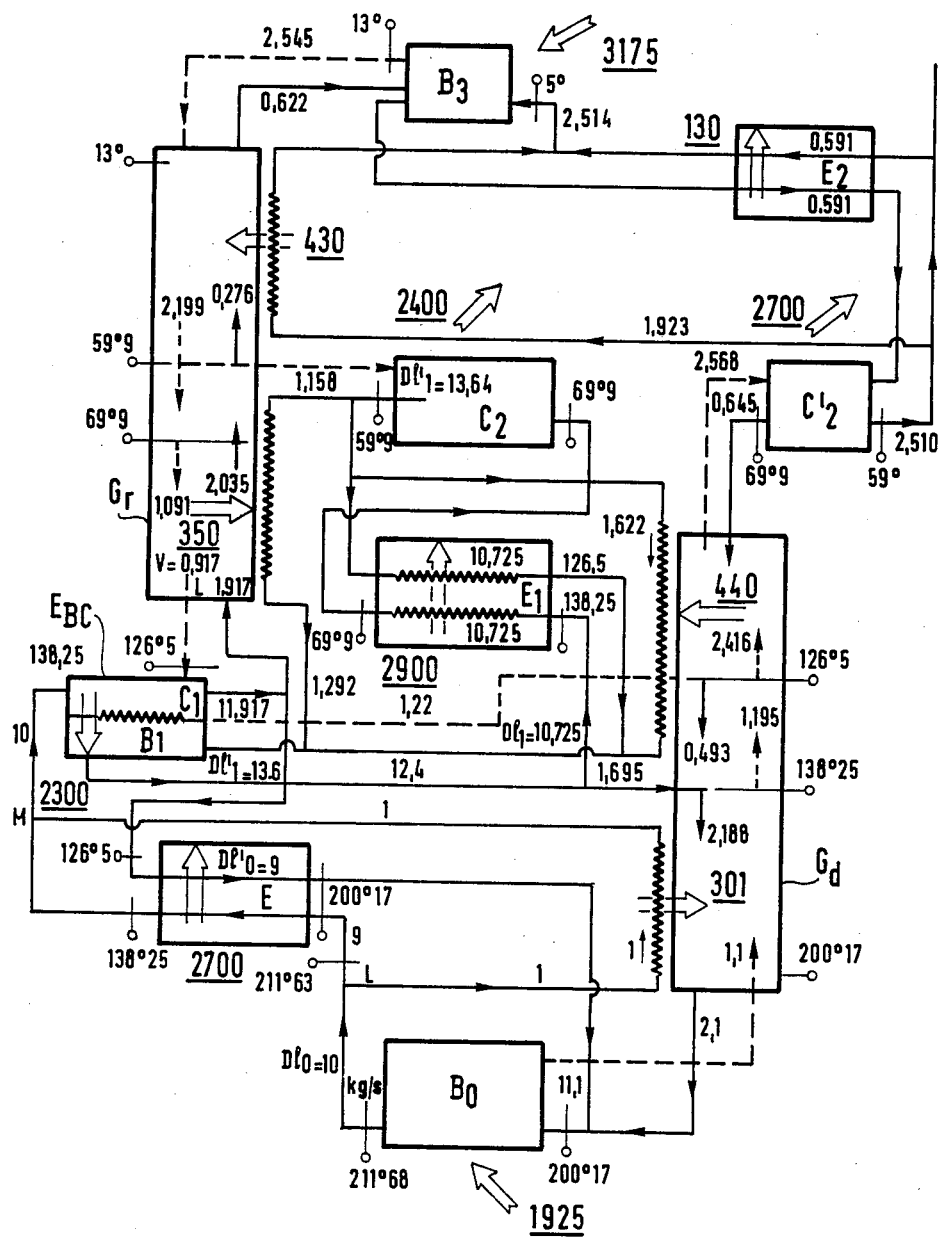

FIGS. 22A and 22B show diagrammatically in 22A and in more detail in 22B, a multi-stage, two column machine; this is a machine using a mixture of ammonia and water. The common temperature area of the columns is 59° C.-238.25° C.

The right hand column $G_d$ is equipped with a distiller $B_o$ receiving the heat (1925 kW) at high temperature level, a distiller $B_1$ receiving 2300 kW from condenser $C_1$ of the left hand column, and a condenser $C'_1$, transferring 2700 kW to the use point at intermediate thermal levels; the left hand column is equipped with a high level condenser $C_1$ transferring 2300 kW to distiller $B_1$ in the right hand column, a condenser $C_2$ transferring 2400 kW to the use point and a low level distiller $B_3$ receiving 3175 kW from a low level source.

In the more detailed diagram in FIG. 22B, the adventitious flow rates exchanging in exchangers $E_o$ and $E_1$ can be seen.

The presence of an exchanger EBC will be noted which boils the working fluid in the right hand column and condenses the working fluid in the left hand column.

Figure 23:
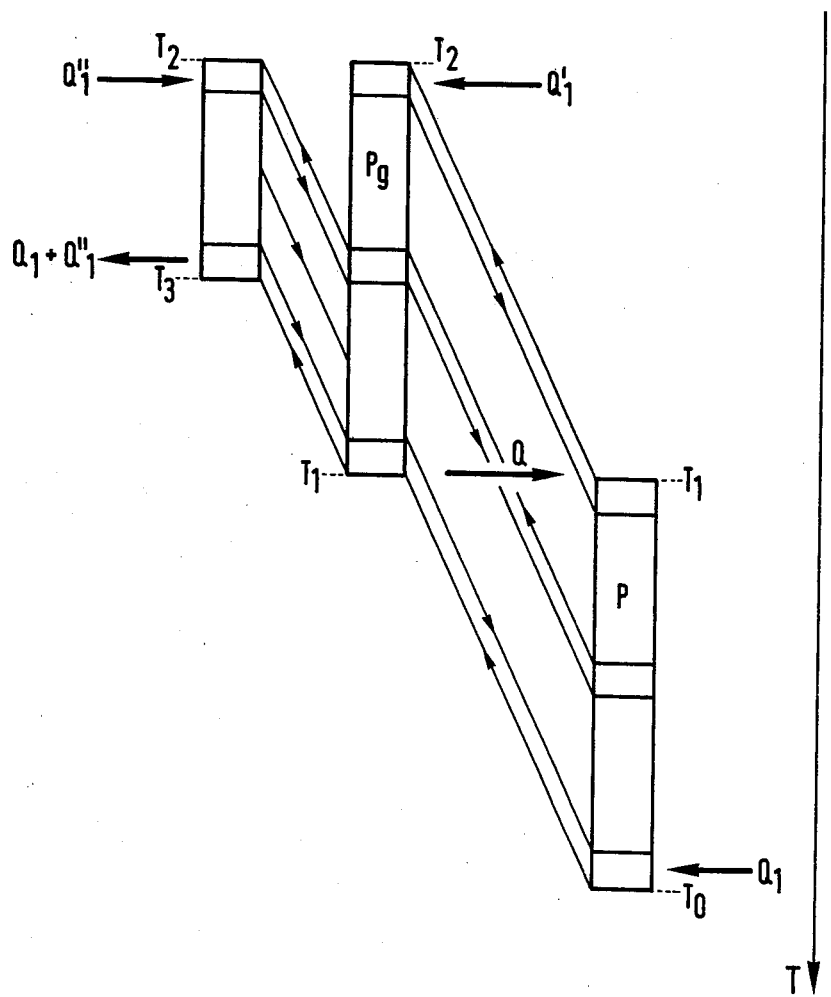
FIG. 23 shows a multi-stage machine obtained by a combination of two single-stage machines shown in FIGS. 22A and 22B.

FIG. 23 is another method of constructing the multi-stage machine obtained by superposing single-stage machines 23A and 23B:
the one 23A with a column at pressure P, temperatures $T_o$ to $T_1$ and a column at pressure Pg at temperatures $T_1$ to $T_2$.
the other 23B with a column at pressure Pg at temperatures $T_1T_3$ and a column at pressure Pg at temperatures $T_3$ to $T_4$. In practice, $T_4$ is very similar to $T_2$ and in any event $T_3$ can be adapted so that $T_4$ is equal to $T_2$.

The first machine receives the heats $Q_1$ and $Q'_1$ at $T_o$ and $T_2$ respectively and supplies $Q_1 + Q'_1$ at $T_1$.

The second machine receives $Q_1^*$ at $T_1$ and $Q''_1$ at $T_2$ respectively and supplies $Q_1^* + Q''_1$ at $T_3$.

There is nothing to prevent including in a single column the two portions of columns of the two machines operating between $T_1$ and $T_3$.

The machine in FIG. 23 is obtained which receives $Q_1$ at $T_o$, $Q'_1 + Q''_1$ at $T_2$ and supplies 0 at $T_1$ and $Q_1 + Q''_1$ at $T_3$.

A multi-stage machine is thus simply obtained.

It is possible to obtain on the basis of the same principles described above, thermal induction machines with external working.

These are twin source machines; the work can be supplied by a turbine (energy production) or absorbed by a compressor (heat pump) along the direction of the exchanges with high and low level sources.

Figure 24:
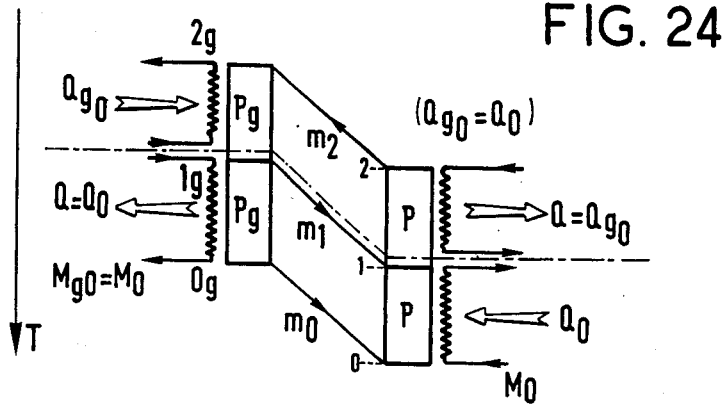
FIGS. 24 to 26 are explanatory diagrams in view of preparing an external working machine.

They can be built as from trithermal diagrams; let us commence for example with FIG. 24, showing two systems of heat transfer with two elements each, mutually inducing in each other, the one at high pressure P, the other at low pressure Pg.

The thermal exchanges between columns and external sources are indicated, together with the adventitious flows. Let us make a break between the two elements of each system as indicated by the mixed line. We obtain the systems in FIGS. 25 and 26, with the bottom of FIG. 25 and the top of FIG. 26 the flows V, Vg and L, Lg of vapor and working fluid liquid.

Figure 26:
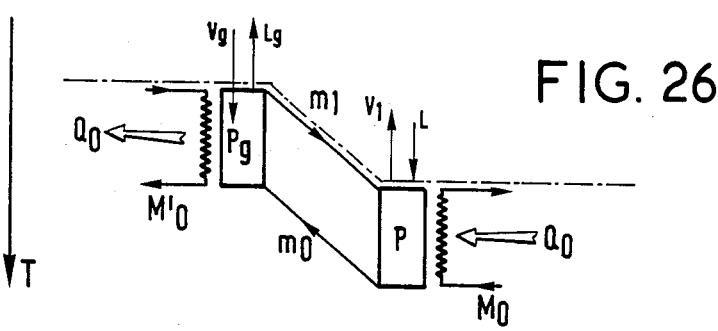

Let us consider FIG. 26 only.

If the vapor circuit V is enclosed by a turbine Tu which expands the gas from P to Pg and supplies the work, and if we link the liquid flows by a circuit Li exchanging heat q with an adventitious flow $m_1$, the heat flow L, we obtain a machine (FIG. 27) supplying external work (w=q) restoring the heat at low temperature levels.

Figure 27:
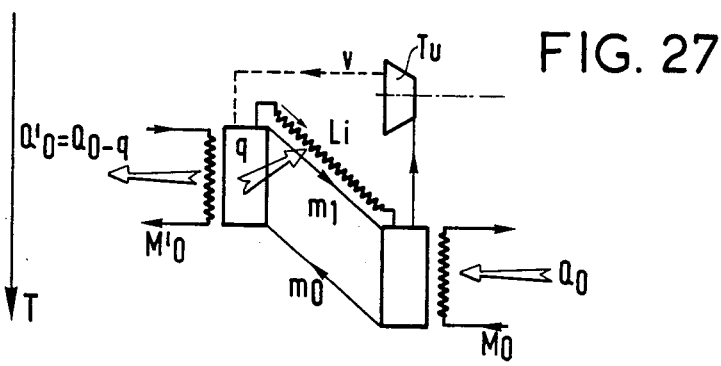
FIG. 27 is a diagram of a thermal induction machine supplying work.
Figure 28:
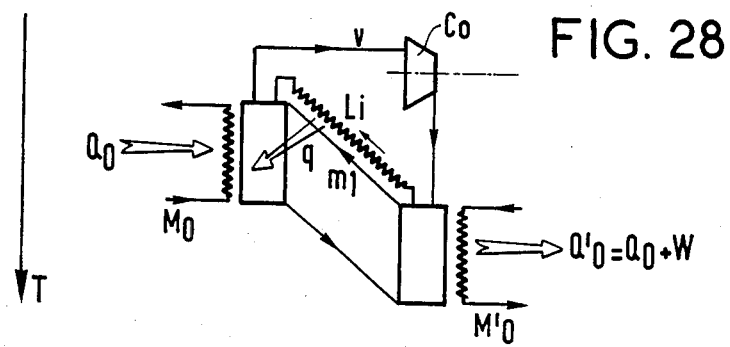
FIG. 28 is a diagram of a thermal induction heat pump according to a first method of construction.

FIG. 28 is a machine reverse from the one in FIG. 27, receiving heat Qo at low level, receiving work W by a compressor Co and supplying heat $Q'_o=Q_o+W$ at high temperature level.

This is a heat pump.

Figure 25:
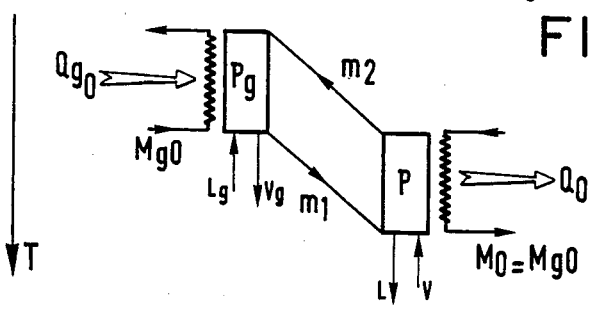
Figure 29:
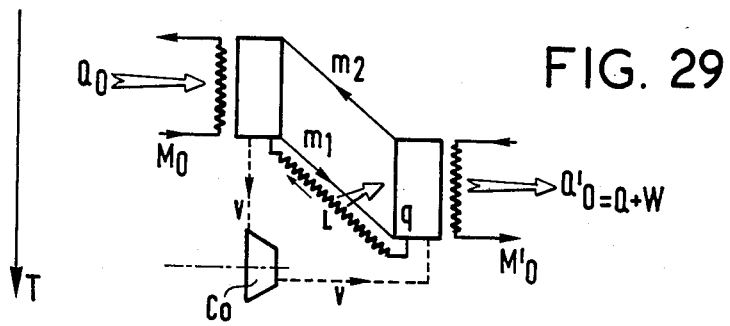
FIG. 29 is a diagram of a thermal induction heat pump according to an alternative version.

FIG. 29 shows a heat pump where the compression is obtained with the vapor circulating between the high level columns, constructed as from the diagram in FIG. 25.

Figure 30:
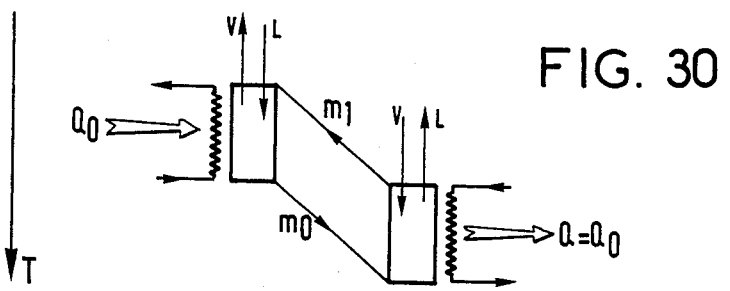
FIG. 30 is the reverse diagram of the one in FIG. 25.
Figure 31:
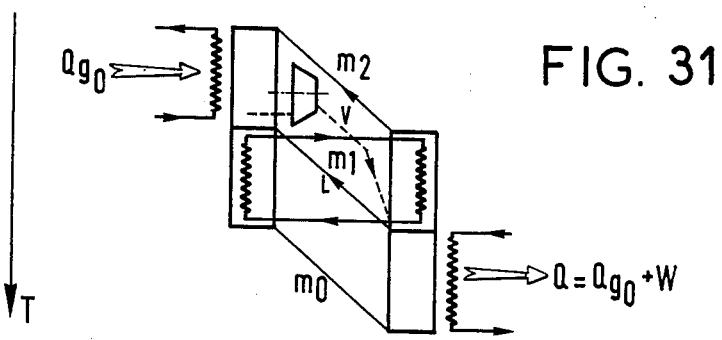
FIG. 31 is the diagram of a thermal induction heat pump according to a third method of construction.

FIG. 30 is the reverse of FIG. 26; associated to a system to that in FIG. 25, it provides for the construction of a heat pump as in FIG. 31, where the effluents are transferred from one column to another at mean temperature level.

Thermal induction type heat pumps can thus be constructed with low, medium or high level temperature compression.

Figure 32:
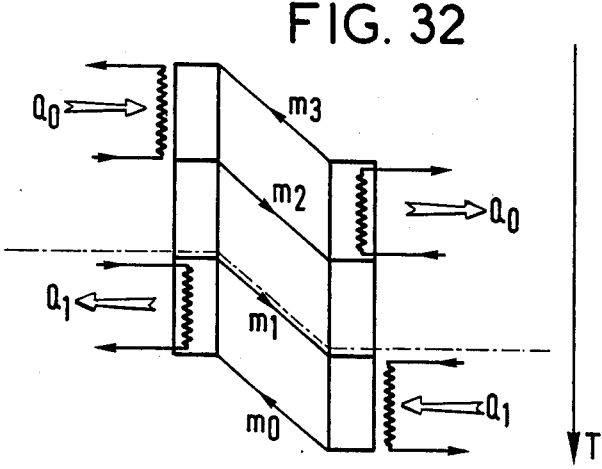
FIGS. 32 to 34 illustrate the construction of a thermal induction heat pump according to a fourth method.

The general nature of the processes used in reference to the FIGS. 24 and 32 shows that one can not only produce heat pumps, but also obtain work as from sensible heat sources.

The heat pumps in FIGS. 28 and 29 are heat-conveyor circuits whose $\Delta T$ temperature differences are equal and continuous from one to the other.

Figure 33:
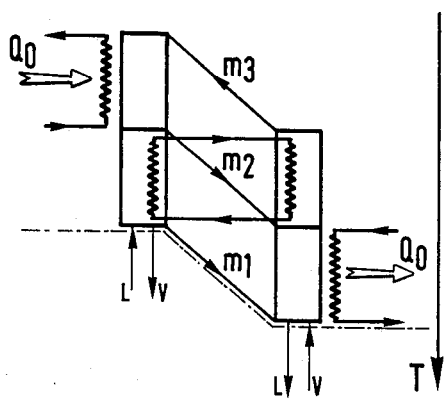
Figure 34:
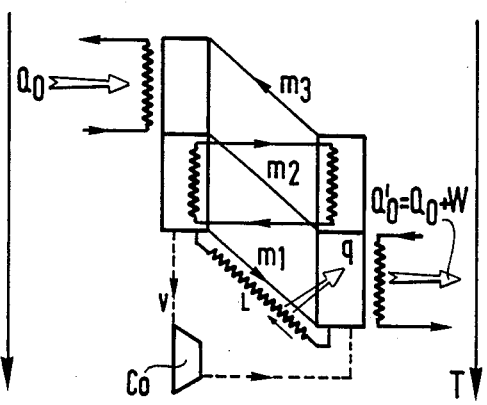

It is possible to separate the heat conveyers by multiple differences of $\Delta T$. Let us consider FIG. 32 showing diagrammatically a quadrithermal machine and made a break according to the mixed line. The upper part (FIG. 33) is preserved; the vapor circuit is enclosed by a compressor Co and the liquid circuit by coupling Li exchanging with the adventitious flow ml (FIG. 34).

Thus a heat pump is obtained where the heat conveyors are separate from $\Delta T$.

$\Delta T$ could in principle be separated 2, 3, ..., n times; but in fact this is unrealistic because the internal exchanges of the system become rapidly prohibitive. Further on will be found a more economical process of exchange surface obtaining the same results (but in return pressure multi-staged).

Figure 35:
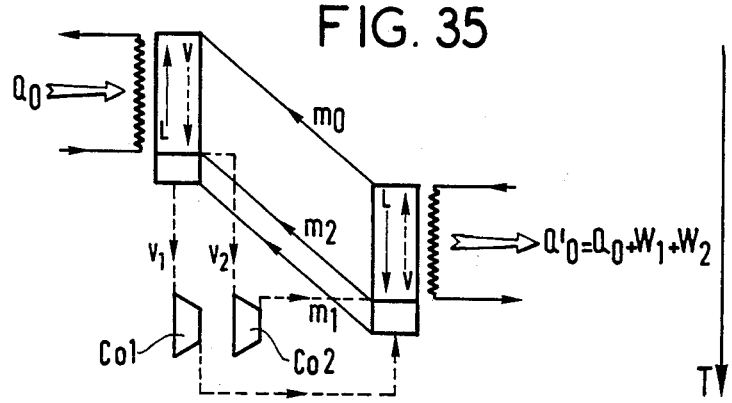
FIG. 35 shows diagrammatically a heat pump according to a fifth method of construction.

The machines just described have the same reversibility nature as the trithermal machine except for the humid or superheated compression detail (whence expansion). If we use a mixture of type R112+R113 as working fluid, one can to a certain extent select, along the columns, a vapor transfer point (at low, medium or high level), so that the state of the vapor on reinjection is practically saturating. Moreover, their operating has the same rigid nature at the nominal point; nevertheless, as soon as it is possible not only to exchange adventitious flows of fluid between the columns, but vapor transports are also used, it is possible to construct configurations of machines reversible at the nominal point capable of associating any heat conveyor circuits; FIG. 35 provides an example.

The external working thermal induction machines that we have examined until now only have two columns.

The machines we have examined until now only contain two columns; morphologies can be considered containing a higher number.

Figure 36:
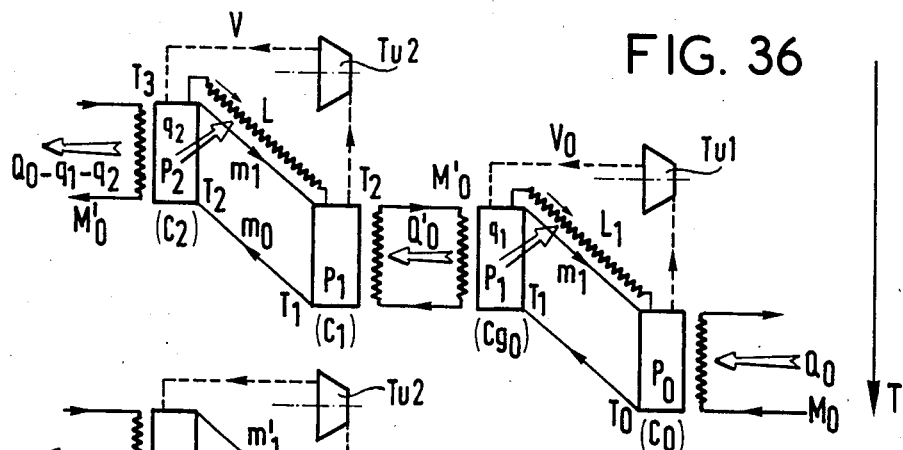
FIG. 36 shows diagrammatically an external working, thermal induction machine containing four columns.
Figure 37:
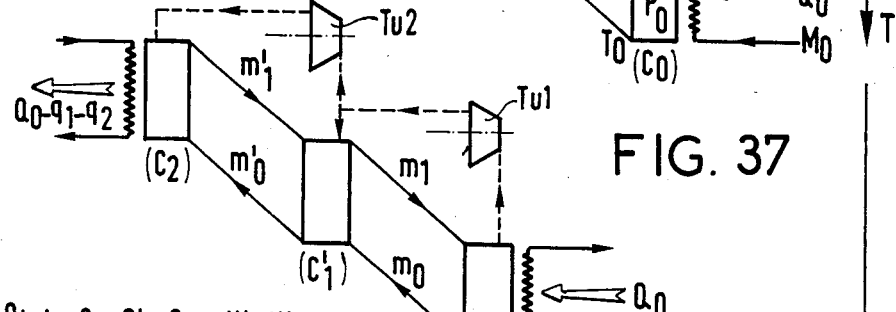
FIG. 37 shows the machine in FIG. 36 reduced to three columns.

FIG. 36 shows such a construction; to the right of this figure we recognize a machine identical to that in FIG. 28, operating between P and P1; it transfers $Q'_o$ at the level of columns Cgo at $C_1$ to a machine of the same type operating between $P_1$ and $P_2$; Cgo and $C_1$ operating at the same pressure $P_1$ and between the same temperatures $T_1$ and $T_2$ can be superposed (FIG. 37); the assembly Cgo, $C_1$, $M'_o$ gives way to column $C'_1$ whose operating results from the supervision of direct and reverse columns $C_o$ and $C_1$, respectively of thermal activity $Q_o$ and $Q'_o$; the thermal activity of $C'_1$ is therefore $Q_o-Q'_o=$; this is thus a weak activity and $C'_1$ is a small auxiliary column.

Figure 38:
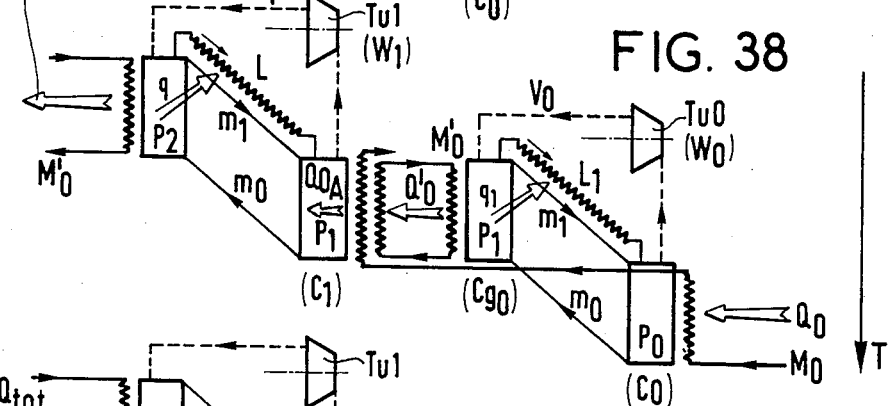
FIGS. 38 and 39 show the respective alternative versions of FIGS. 36 and 37.
Figure 39:
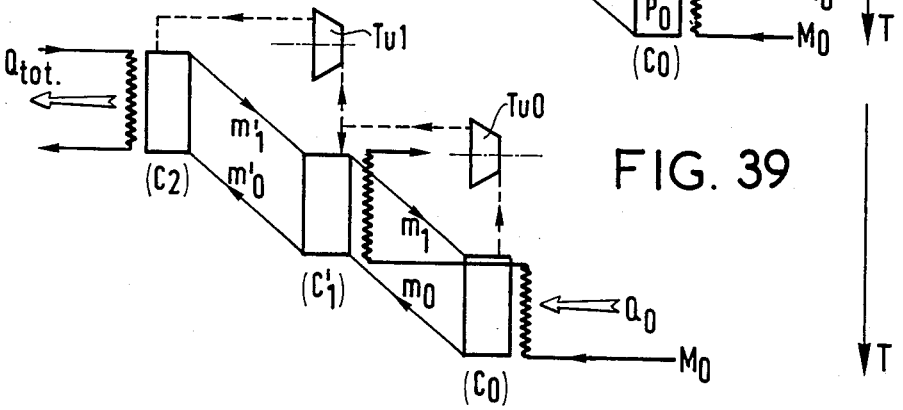

Another example, in FIGS. 38 and 39; has the same arrangements as above; in addition the heat conveyer $m_o$ heats $C_1$; column $C'_1$ (FIG. 39) is the source of the thermal activity $2Q_o-Q'_o=Q_o+q1$.

Figure 40:
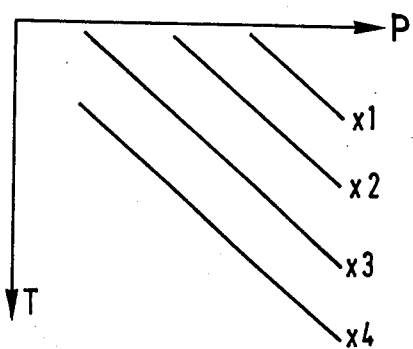
FIG. 40 is a diagram of the isoconcentrations of heat-conveyer liquid depending on the pressure and temperature.
Figure 41:
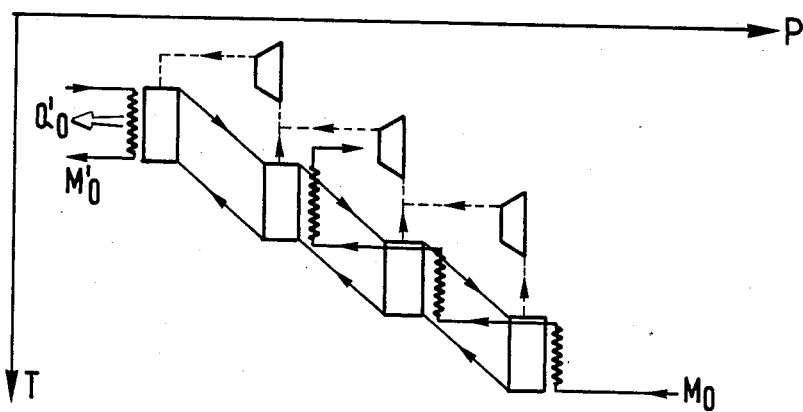
FIGS. 41 and 42 are diagrams of external working thermal induction machines with four to six stages respectively.
Figure 42:
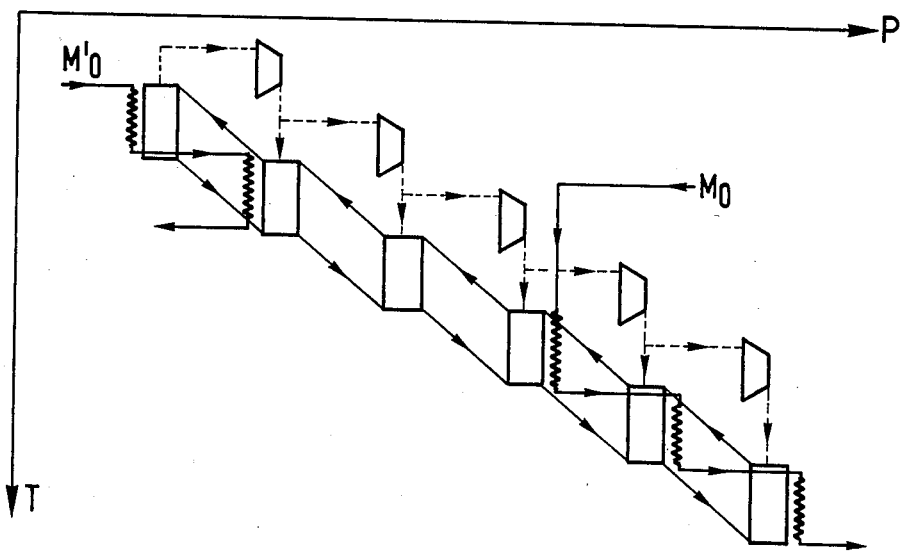
Figure 43:
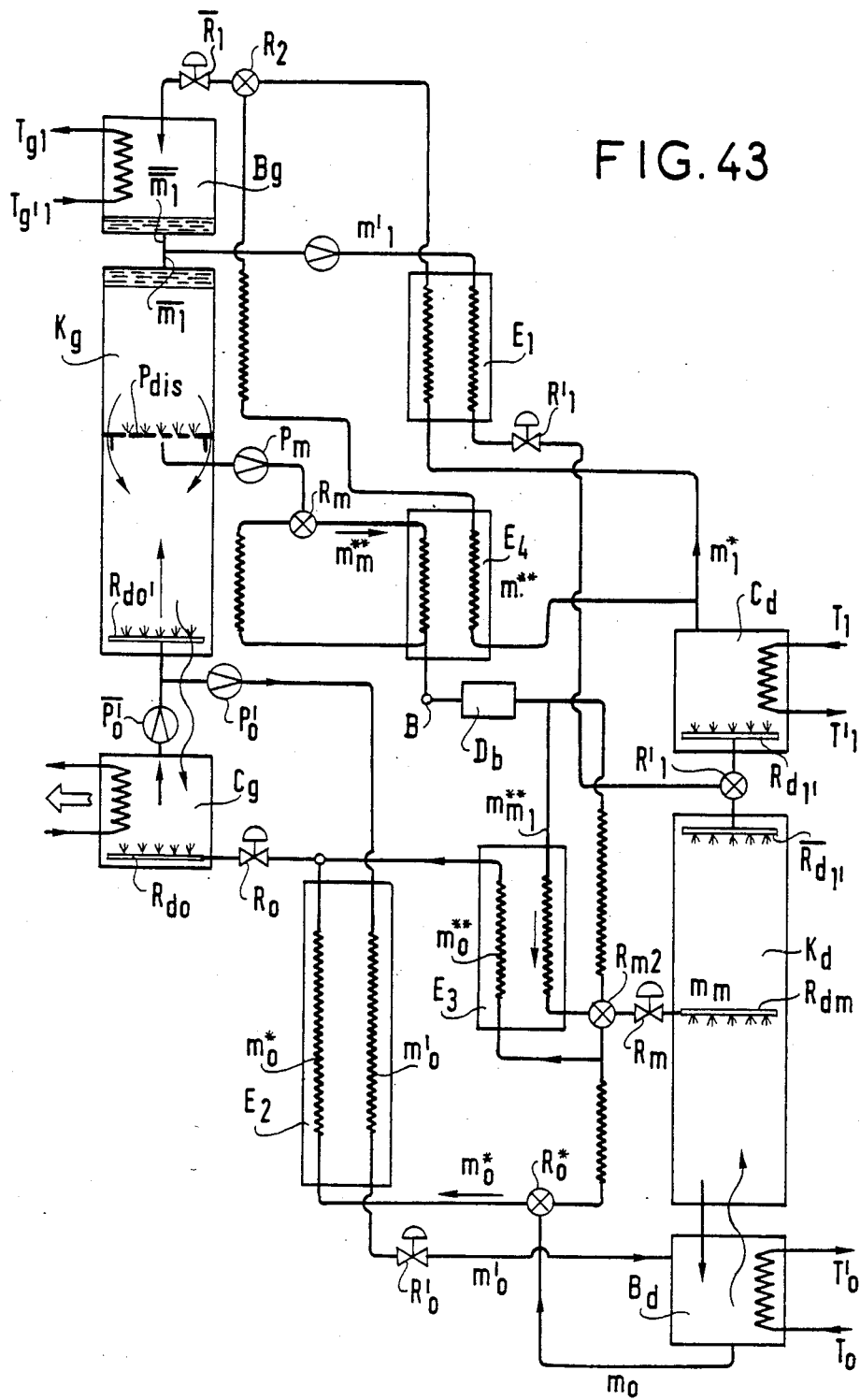
FIG. 43 is a diagrammatic view of the thermal induction machine of FIG. 13, complete with all the fittings of the apparatus.
Figure 44:
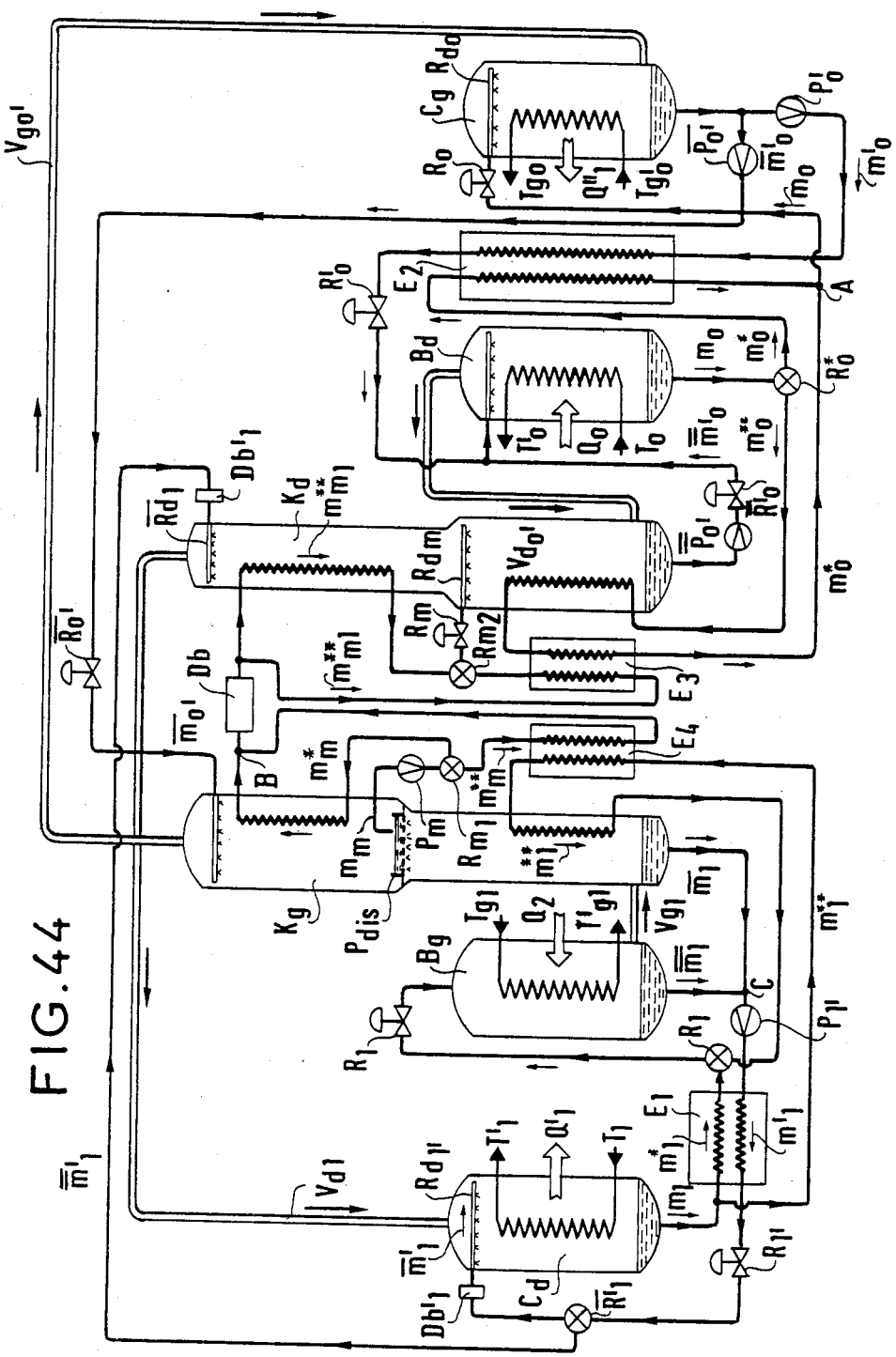
FIG. 44 is a diagrammatic flow sheet of the system exemplified by FIG. 14, in greater detail.

It is convenient to show multi-stage machines on diagrams where the pressure is in abscissa, the temperature towards the bottom (as usual); the isocentrations x=constant are as shown in FIG. 40. FIG. 44 shows a realistic flow sheet of the system, equivalent to that of FIG. 14 but more detailed and suggestive. The corresponding diagrammatic layout of FIG. 43 is a new version of FIG. 13 completed with all the fittings of the apparatus. Nomenclatures of physical magnitudes and subassemblies in FIGS. 44 and 43 are the same as in FIGS. 12 and 13; thus, the corresponding parts of FIGS. 44, 43 and 14 may be easily identified.

In the case considered, the difference of temperature $T_o-T_o'$ is small by hypothesis; this justifies that no arrangement is provided to exchange heat between mass flow rate $m_o$ and evaporator Bd; this means that $\Delta T_o=T_o-T_o'$ is the temperature difference of exchange in the heat exchanger E2. The generality is in no way affected by this special feature because adding in Bd coils providing heat from $m_o$ does not change basically the structure of Bd, nor the general constitution of the system. For the same reasons, we suppose that there is no heat exchange between $m'_o$ and Cg, between $m_{1'}$ and Cd, $m_1$ and Bg.

For the sake of a good understanding of the system operation, we shall now consider successively the liquid circuits mass flowrates $m_o$, $m_o'$, $m_m$, $m'_1$, and $m_1$, and vapor streams Vgo', Vg1, Vdo', Vd1 showing how the theoretical embodiment of FIGS. 12 and 12 are realised practically; then the structure of the system subassemblies will be described.

Flow rate $m_o$ $m_o$ is extracted from the bottom of evaporator Bd; then it is divided into two parts $m_o*$ and $m_o**$ by means of a three way cock Ro* ; then $m_o*$ traverses the classical liquid-liquid heat exchanger E2, exchanging heat in a counter current manner with $m'_o$; $m_o$ exchanges heat with the stripping part of distillation column Kd using a disposition described later; then exchanges heat with $m_{m1}$ in traversing the classical liquid-liquid counter current heat exchanger E3; $m_o*$ and $m_o**$ join together at point A, thus restoring the mass flow rate $m_o$; passing through throttle $R_o$ the pressure of flow rate $m_o$ drops from P to Pg; $m_o$ is then introduced at the top of condenser Cg by means of a classical inlet liquid distributor Rdo using distributers pipes pierced with holes on their underside and adjusted to provide uniform stream entry across the area at the top of the vessel Cg.

Flow rate $m_o'$

The condensate which gathers at the bottom of condenser Cg is divided into $\overline{m}_o'$ and $m_o'$; the required value of $\overline{m}_o'$ and $m_o'$ and their $\Delta p$ from extraction to introduction along their circuits are adjusted using respectively pump $\overline{Po}'$, cock $\overline{Ro}'$ and pump Po', cock Ro'. $\overline{Po}'$ is a low lifting pump. Po' is a pump raising the pressure to a value allowing $m_o'$ to pass through $E_2$ and Ro' and to enter into Bd at pressure P; $m_o'$ is dispersed at the top of column Kg using an inlet liquid distributor; $m_o'$ joins in the liquid stream collected at the bottom of Kd and adjusted at its mass flow rate and pressure by the combined use of the law lift pump $\overline{Po}$, and cock $\overline{Ro}'$, the mass flow rate $m_o' + \overline{m}_o'$ is dispersed at the top of Bd using an inlet liquid distributor.

Flow rate $m_m$

The desired value of $m_m$ is extracted from the classical liquid redistributor Pdis, and its pressure raised from Pd to a value P'm allowing its passing through the successive head losses (heat exchangers and cocks), and its introduction, into column Kd at pressure P; this is achieved by the simultaneous use of pump Pm and cock Rm. After passing through $P_m$, $m_m$ is divided ints $m_m^*$ and $m_m^{**}$, using the three way cock $Rm_1$; $m_m^*$ first exchanges heat with the upper part of column Kg using a disposition described later; $m_m^{}$ exchanges heat with $m_1^{}$ in $E_4$; $m_m^*$ and $m_m^{**}$ join altogether in B to restore $m_m$: $m_m$ crosses a flow meter Db, then is divided again into $m_{m1}^*$ and $m_{m1}^{**}$ using, the three way cock $Rm_2$: $m_m^*$ exchanges heat with the rectification part of Kd using a disposition described later; $m_{m1}^{}$ exchanges heat with $m_o^{}$ in $E_3$; and $m_{m1}^*$ and $m_{m1}^{**}$ join altogether to restore $m_m$; after passing through Rm, $m_m$ is dispersed at the level of the feed section of Kd using in inlet liquid distributor Rdm.

Flow rate $m'_1$

The mass flow rate $\overline{m}_1$, gathering at the bottom of column Kg, and that $\overline{m}1$, gathering at the bottom of evaporator Bg are joined together in C to restore $m'_1$. The combined use of pump $P'_1$ and cock $R_{1'}$ effects the adjustment of $m_{1'}$ at its required value, and the raising of the pressure to a value $P_1$, allowing the passing of $m_1$, through the head losses due to the three way cock $R_{1'}$, the flow meters $Db'_1$ and $\overline{D}_{b'1}$, and the inlet liquid distributors $Rd_{1'}$ or $\overline{Rd}_{1'}$, and the introduction at pressure P respectively of $\overline{m}'_1$ and $\overline{m}'_1$ in vessels Cd and Kd.

Flow rate $m_1$ $m_1$ is gathered at the bottom of Cd; it is divided into $m_1^*$ and $m_1^{**}$; $m_1$ exchanges heat with $m_1'$ in $E_1$; $m_1^*$ exchanges heat, first with $m_m^{**}$ in $E_4$, then with the bottom of columm Kg; $m_1^*$ and $m_m^{**}$ joinaltogether in the three way cock $R_1$, restoring $m_1$; $m_1$ is then throttled and introduced at pressure Pg at the top of evaporator Bg.

Vapor streams $Vg_{o'}$, $Vg_1$, $Vd_{o'}$, $Vd_1$ $Vg_{o'}$ is conveyed from the top of column $K_g$ to the bottom of condenser $C_g$ through simple pipes with no special equipment. Likewise $Vg_1$ is conveyed from bottom of evaporator $B_g$ to bottom of column $K_g$, $Vd_{o'}$ from top of evaporator $B_d$ to bottom of column $K_d$, $Vd_1$ from top of $K_d$ to top of $C_d$. It is obvious for a man skilled in the art to evolve a programm of calculation allowing to determine for a given problem the optimal values of pressures P and $P_g$, mass flow rates $m_o$, $m_o'$, $m_m$, $m'_1$, $m_1$, temperatures $T_o$, $T_{o'}$, $T_m$, $T_{1'}$, $T_1$, $T_{go}$, $T_{go'}$, $T_{gm}$, $T_{g'}$, $T_{g1}$, to measure the same magnitudes, to process their discrepancies in order to deliver control order to the servo-pumps and cocks and to the heater providing $Q_o$ to $B_d$. Preferentially only the regulations of pumps $P_{o'}$, $\overline{P}_{o'}$, $P_m$, $P_{1'}$ and cocks $R_o$, $R_{o'}$, $\overline{R}_{o'}$, $R_m$, $R_{1'}$, $R_1$ should be involved in the latter algorithm, whilst the three way cocks $R_o^*$, $R_m$, $R_{m1}$, $R_1$ should be operated in using separate regulations, in such a way that the dividing of $m_o$, $m_m$, $m_1$ respectively by cocks $R_o^*$, $R_m$ and $R_{m1}$, $R_1$ provide values of flow rates $m_o^*$, $m_{m1}^{}$, $m_m^{}$, $m_1^*$ just adequate to exchange heat with $m_o'$, $m_o^{}$, $m_1^{}$, $m'_1$ in the liquid liquid exchangers $E_2$, $E_3$, $E_4$, $E_1$ at constant $\Delta T$ of exchange; obviously these separate regulations are based on the measurement of the $\Delta T$ at each end of the heat exchangers. Furthermore the three way cock $\overline{R}_1$ is operated by controlling the flow rates introduced in $C_d$ and $K_d$, using the flow rates $D_{b'1}$ and $\overline{D}_{b'1}$. All the subassemblies mentioned above as pumps, cocks, inlet liquid distributors are classical equipments in chemical engineering. Columns $K_d$ and $K_g$ are special. Exchangers $B_d$, $C_d$, $C_g$, $B_g$ could be designed as classical evaporators and condensers of two component mixtures. (sec Process Heat Transfer, Kern, Mcgraw Hill) However special and unconventional designs, likely to increase appreciably the efficiency of the overall system are preferable. Therefore, one but not unique feasible realisation for each of the devices $B_d$, $K_d$, $C_g$, $K_g$, $C_d$, $B_g$ is described hercafter.

We shall consider two groups of apparatuses:

(a) the group $B_d$, $K_d$, $C_g$, $K_g$ in which the liquid and vapor phase move at countercurrent (b) the group $B_g$, $C_d$ in which two phases move at cocurrent

Equipments of the countercurrent type

In countercurrent type equipments two physical operations are implemented simultaneously:

(a) a direct contact exchange of heat and mass between a liquid phase flowing downwards under the effect of gravity, and a raising vapour phase, quite similar to those realised in distillation column.

(b) exchange of sensible heat with an outer heat carrying circuit.

Figure 45:
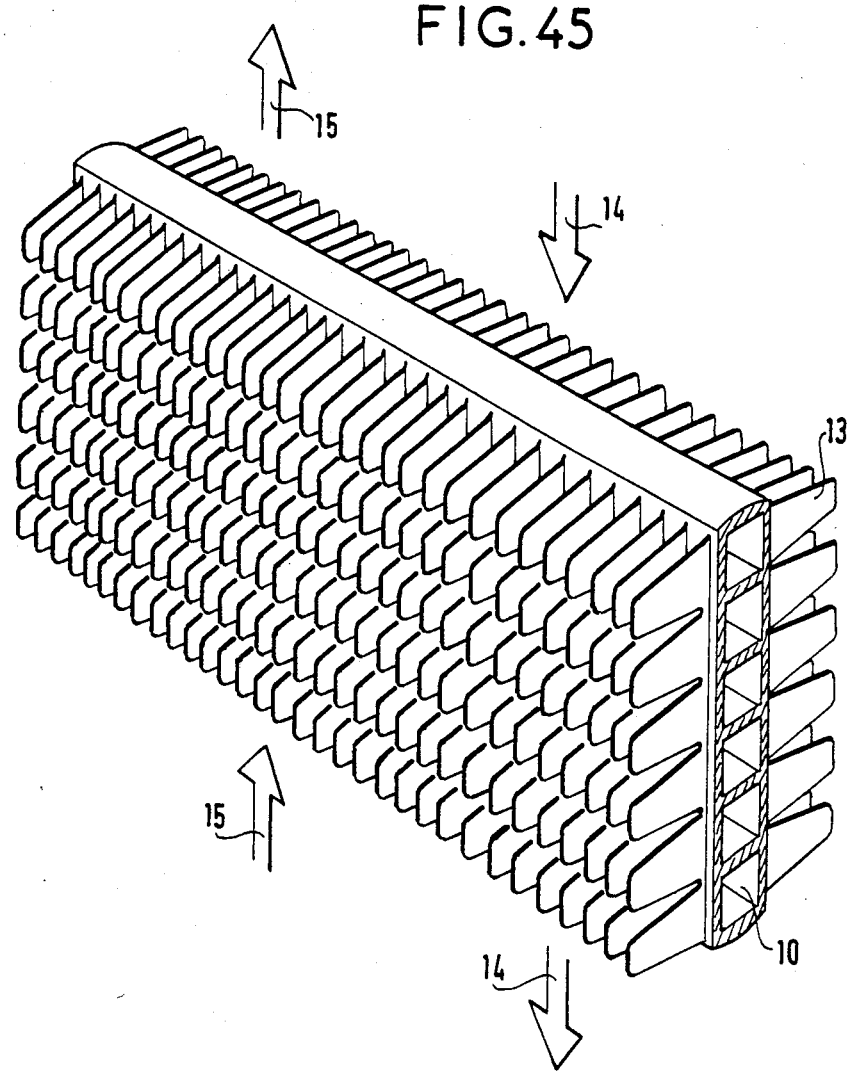
FIG. 45 is a perspective view of a section of a multi-pipe turbulure illustrating one of the heat exchangers in which the liquid working fluid circulates.

This is realised in contact columns, the structure of which is in accordance with FIG. 19. As the horizontal coils S of FIG. 19, finned tubes of the Skyvefin type are utilised, such as those represented in perspective in FIG. 45; on can see in cross section the profile of a multiple tubulure 10 allowing the working fluid or the outer sensible heat conveyor to traverse several channels exchanging heat by convection at the wall of the channels. The heat is then transferred by conduction to the fins 13. The liquid working fluid 14 descending and the vapor working fluid 15 ascending in the column exchange heat with the fins by direct contact. The use of the skyvefin exchanger is a double asset:

(a) dividing the circuit of a given mass flow rate into several sub circuits increases both the overall heat transfer area and coefficient.

Figure 46:
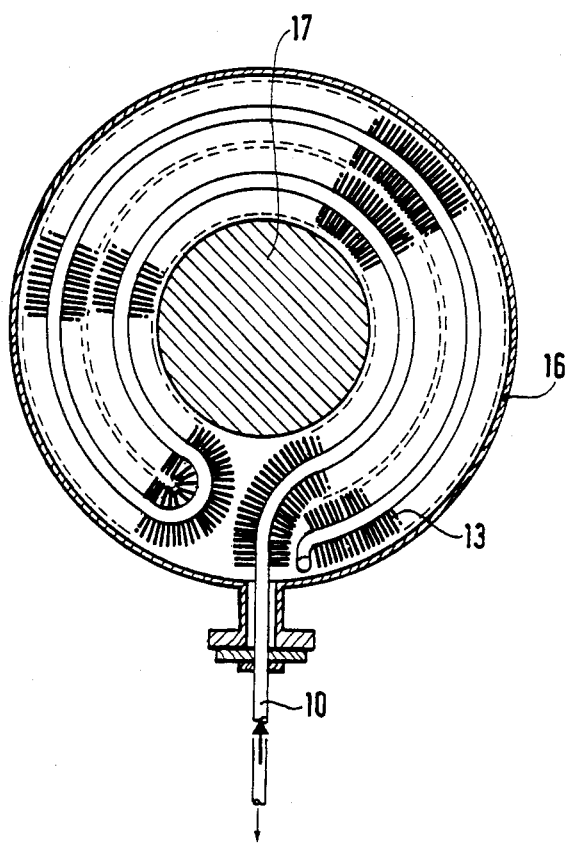
FIG. 46 is a sectional view of a cylindrical form heat exchanger employed in the present invention.

(b) Using specific tools one can easily bend the multipipe tubulure so as to transform its axis of symetry into a cylinder. By means of several successive transformations one can obtain a general shape like the one of FIG. 46 where the fins fill practically the whole cross section of annular area comprised between the outer wall 16 of the column and a central body 17; of course arrangements of this type, other this of FIG. 46 may be realised.

It is clear that the liquid stream falling down in the column is vearly totally collected by the fins, and forms a systeme of films flowing down along the fins; the latter may be considered altogether as heat exchange area between the outer heat conveyor, and the two phase working fluid in the column and interfacial contact area for the heat/mass exchange between the liquid and vapor phase as the overall area of the fins is large, the situation of the working fluid is close to thermodynamical equilibrium. However the use of Skyvefin arrangements creates preferential passages for the liquid. For that reason a conventionnal packing is used to obtain an homogeneous distribution in the cross area.

Finally the general process consisting in a simultaneous exchange, close to equilibrium between a two component, two phase working fluid and an outer heat conveyor is achieved by successive stacking of Skyvefin arrangements and conventional packings placed at different discrete levels. On can see in FIG. 19 a sketch diagram of the overall arrangement; S is the outer heat conveyor consisting of five Skyvefin arrangements; $C_c$ is the intermediary packing.

We now examine the structure of the evaporator Bd.

In FIG. 44, one can see a sketch diagramm of Bd showing the general operations implemented:

a dispersion at the top of Bd of the mass flow rate $\overline{\overline{m}}_o + m_o$, an addition of heat $Q_o$ from an outer sensible heat conveyor ascending through Bd and subject to the temperature drop $T_o$ to $T_o'$, the formation of the vapor phase $Vd_o$, exhausting at the top of Bd.

the collection of the liquid at the bottom of Bd, and the subsequent removal of mass flow rate $m_o$.

Figure 47:
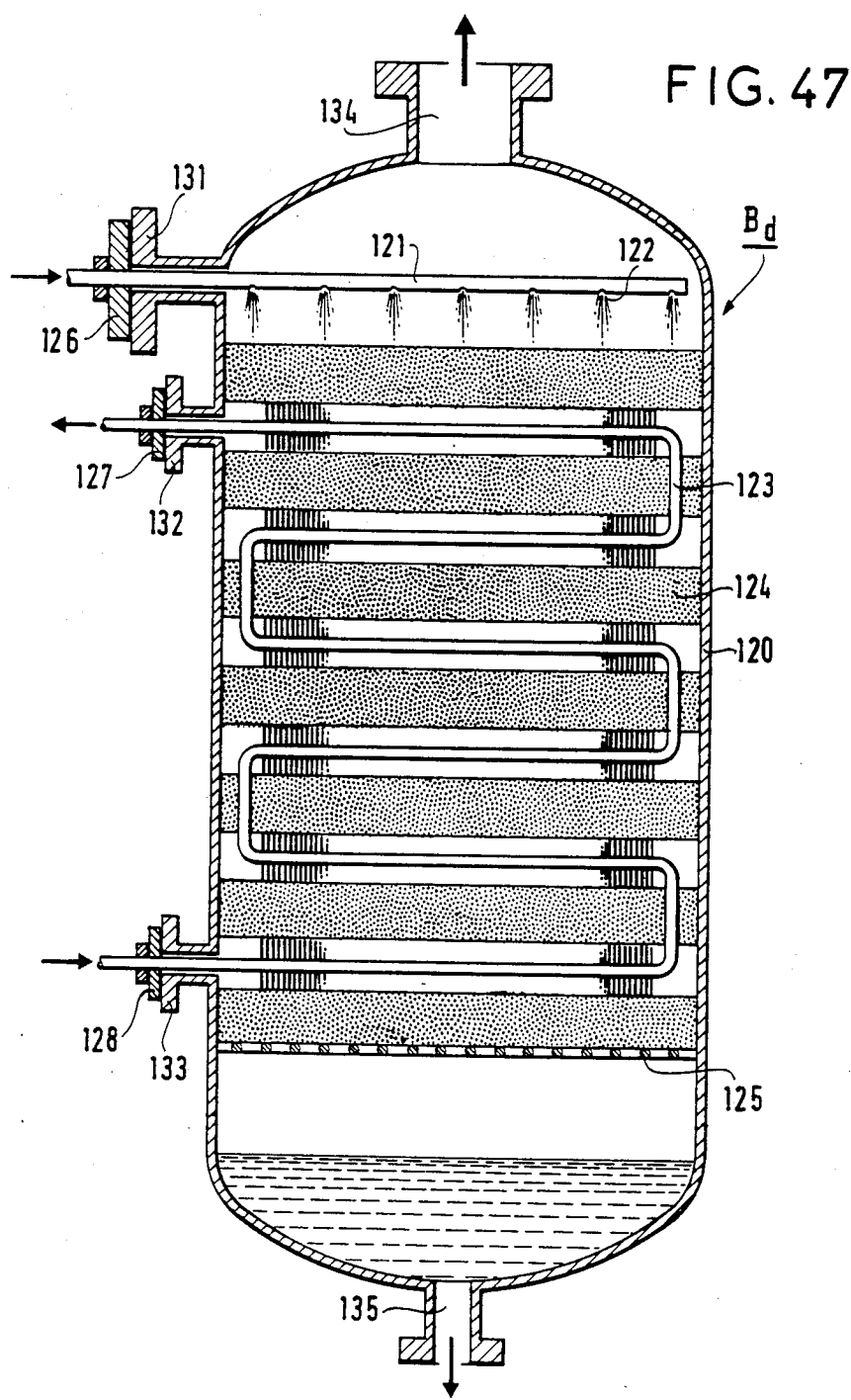
FIG. 47 is a vertical sectional view of a cylindrical vessel incorporating stacked successive heat exchangers.

FIG. 47 shows a typical realisation of Bd; it consists of a vertical, cylindrical vessel 120 comprising an inlet liquid distributor 121 dispensing the liquid through the holes 122, a stacking of successive Skyvefin arrangements 123 and packing 124 as described above, a packing support 125, tightness joints 126, 127 and 128 for the introductions/exits 131, 132, 133 of liquid circuits, exhaustpipes 134, 135 for the removal of respectively the vapor and liquid of the working fluid.

Column Kd (distillation column)

Figure 48:
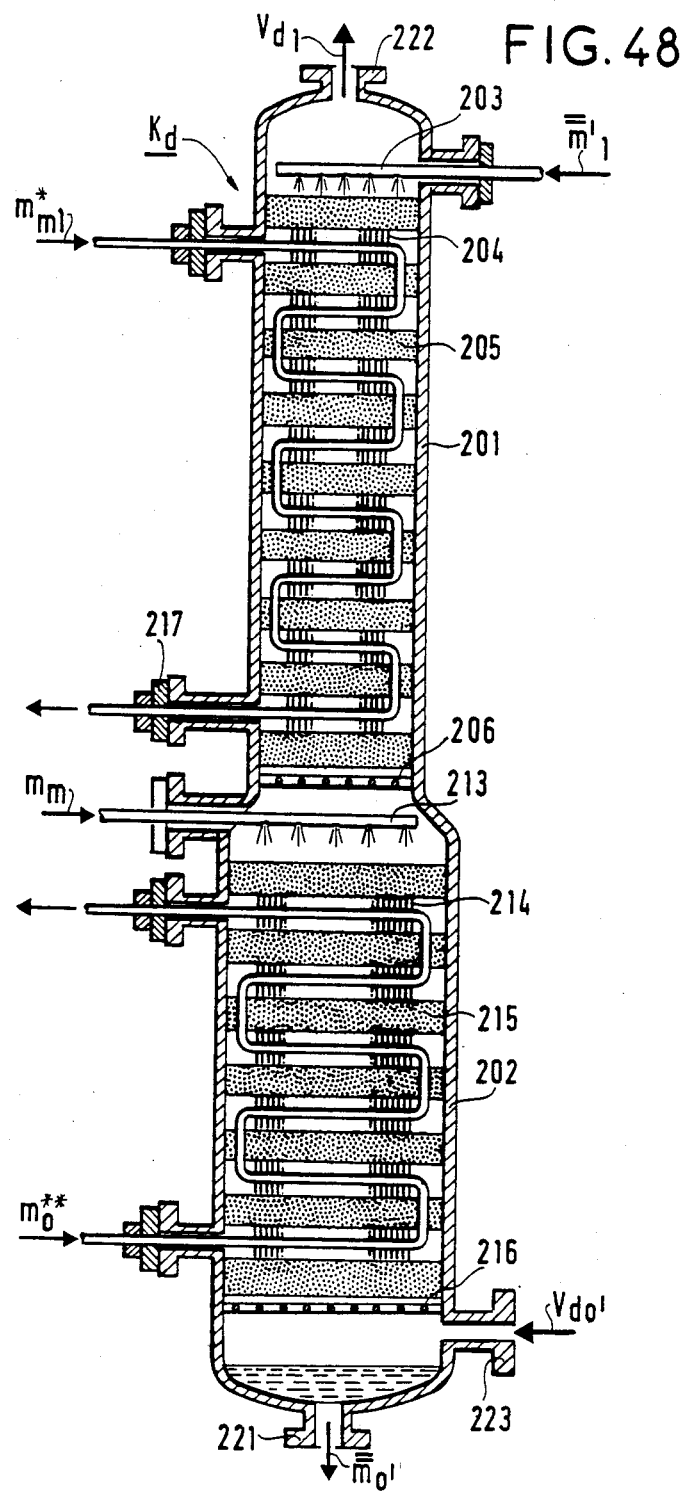
FIG. 48 is a schematic diagram, in vertical section, of a distillation column employed in the machine of the present invention.

In FIG. 44 one can see a sketch diagram of Kd showing the general operations implemented.

an introduction of the liquid mass flow rate $\overline{\overline{m}}_1'$ as the reflux of the distillation process at the top of the column introduction of vapor mass flow rae $Vd_{o'}$ at the bottom introduction of $m_m$ at the mid-section of Kd cooling of the rectificatons columm by circuit $m_{m1}$* heating of the stripping columm by circuit $m_o$** formation of the vapor phase $Vd_1$ exhausting at the top of Kd collection of the liquid phase at the bottom of Kd and subsequent removal of mass flow rate $\overline{\overline{m}}_o'$ FIG. 48 shows a realisation of Kd; Kd has the general features of a distillation column, however its particular conditions of operation are such that as a result of the optimisation of its design, the rectification part 201 of the column 1 has a smaller diameter than the stripping part 202 of the column; the mass flow rate $\overline{\overline{m}}_1'$ is dispersed at the top of the rectification column by means of the inlet liquid distributor 203. The general structure of both rectification, and stripping column is a stacking of successive Skyvefin arrangements 204, 214 and packings 205, 215 sustained by a packing supports 206, 216. Mass flow rate $m_m$ is dispersed in the feed section by accumulated liquid distributor 213. As subsidiary elements the system comprises also tightness joint as 217 for the entry/exit of the different circuits in the column, and pipes respectively 221, 222, 223 for the introduction or removal of mass flow rates $\overline{\overline{m}}_{o'}$, $Vd_1$, $Vd_{o'}$, Condensor Cg In FIG. 44, one can see a Sketch diagram of Cg showing the general operations implemented a dispersion of mass flow rate $m_o$ at the top a realease of heat $Q_1''$ to an outer sensible heat conveyor subject to an increase of temperature from Tgo to Tgo' an introduction at the bottom of Cd of flow rate $Vgo'$ to be condensed a collection of the liquid at the bottom of vessel and its subsequent removal.

Figure 49:
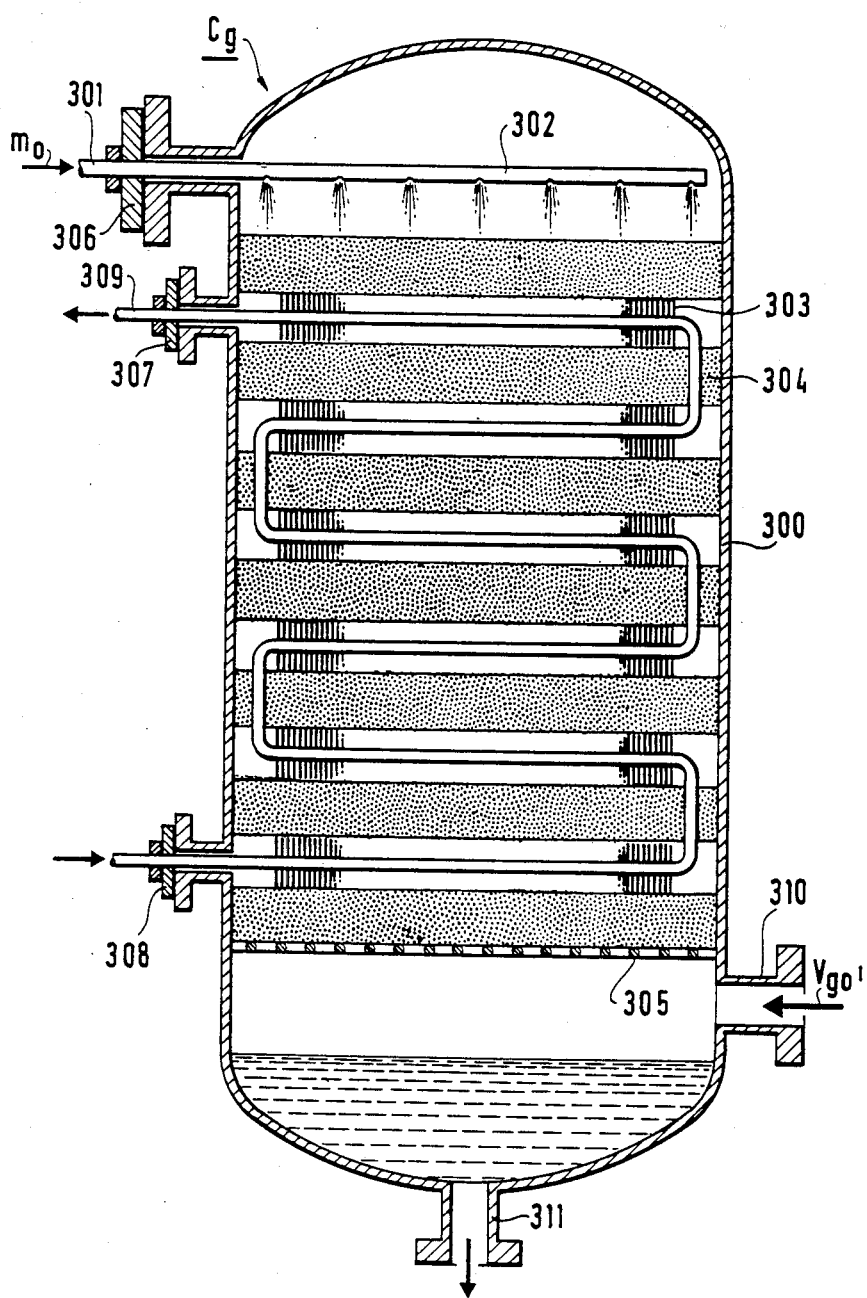
FIG. 49 is a vertical sectional view of a cylindrical vessel for conveying effluents through the system of the present invention.

FIG. 49 shows a realisation of Cg; it consists of a cylindrical vertical vessel 300 comprising an inlet 301 and a liquid distributor 302 dispensing a mass flow rate $m_o$, a stacking of successive Skyvefin arrangements 303 and packings 304 sustained by a support 305 and subsidiary elements as tightness joints 306 to 308 and pipes 309, 310, 311 to convey the effluents through the system. Column Kg FIG. 44 indicates the different operation operated in Kg a dispersion of mass flow rate $\overline{m}_o'$ at the top of column collecting and extraction the liquid phase at the bottom of Kg.

exchanging heat with $\overline{m}_o'$, at the upper part of Kg, with liquid introduced at a flow rate $m_m$* adding liquid at the mid section at a flow $m_m$ exchanging at the lower part at Kg, with liquid introduced at a flow mate m'** exchanging heat with vapor flow stream flowing upwards.

Figure 50:
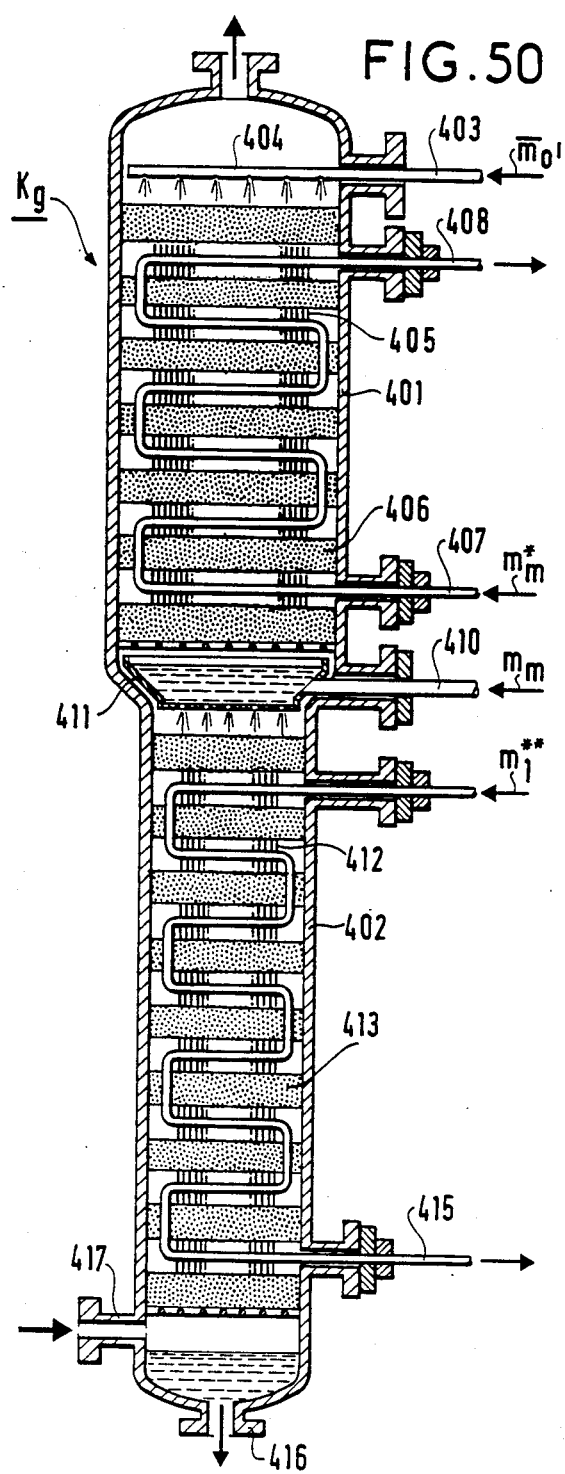
FIG. 50 is a vertical sectional view of a distillation column similar to that of FIG. 48.

FIG. 50 shows a realisation of Kg which is in fact closely similar to Kd.

The column kg comprises a vessel the upper part 401 of which has a diameter larger than the lower part 402 thereof; liquid at flow rate $\overline{m}_o'$ is introduced by pipe 403 and dispersed by a distributor 409.

The part 401 is filled with a stacking of Skyvefin arrangement 405 and packings 406. The liquid is introduced at the bottom of the stacking by a pipe 407 and exits in 408, at a flow rate $m_m$*.

At the mid section of the column Kg, liquid is introduced at a flow rate $m_m$ by a pipe 410 and dispersed by a distributor 411. It exchanges with a stacking of Skyvefin arrangements 412 and packing 413, receiving liquid through a pipe 414 at a flow m'**. The liquid exits through a pipe 415.

At the bottom of the column an aperture 416 allows condensed liquid to escape at a $\overline{m}_1$ flow rate.

The whole column exchanges heat with a stream of vapour introduced at the bottom by an opening 417 (flow rate Vg1) and leaving at the bottom by an opening 418 (flow rate Vgd). The distributor 411 is separated from the adjacent wall in order to let the vapor stream flow upwards.

Equipements of the cocurrent type

Condensor Cd

FIG. 44 shows the details of the operations implemented: at the top of vessel Cd, liquid flow rate $\overline{m_1}'$ is dispersed, while in the same regions vapor stream $V_{d1}$ is introduced. Both liquid and vapor stream moving donwards in contact in a cocurrent manner release the heat $Q_1'$ to an outer heat conveyor (subject to a temperature increase from $T_1$ to $T_{1'}$), in such a way that the vapor condensed totally; the liquid at the bottom of Cd is subsequently extracted.

Figure 51:
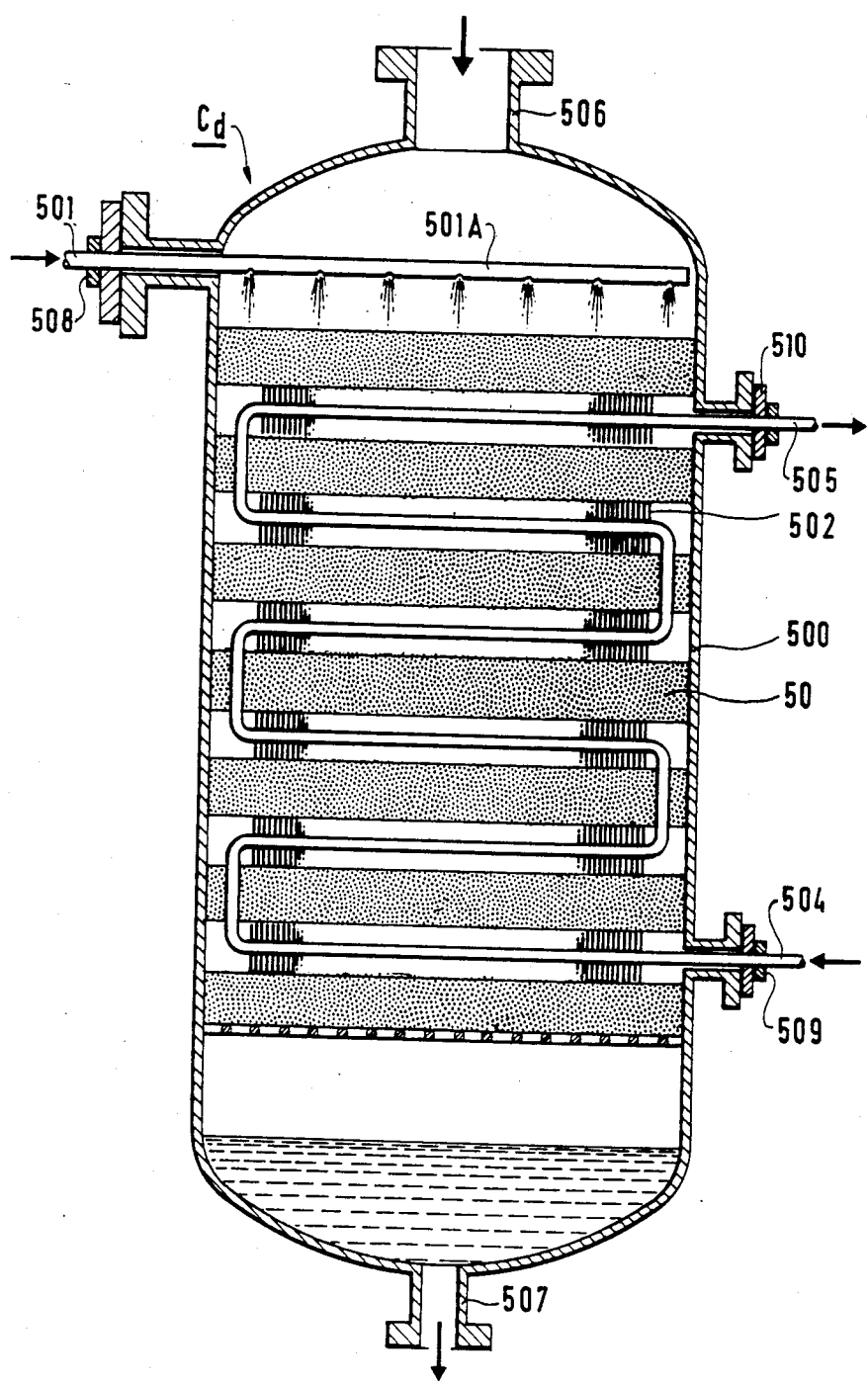
FIG. 51 is a vertical sectional view of a cylindrical vessel similar to that of FIG. 50.

FIG. 51 shows a realisation which is very similar to that of FIG. 50 although the operating conditions are different.

Cd comprises a vertical cylindrical vessel 500 comprising an liquid 501 inlet a distributor 501A, a stacking of successive Skyvefin arrangements 502 and packing 503. The stacking is fed at flow rate $\overline{m}'$, through an inlet pipe 504 at the bottom, the liquid leaving through an exit pipe 505. The gas is introduced at the summit of the column through the aperture 506. Liquid is extracted at the bottom of the column by an exit pipe 507. Pipes 501, 504 and 505 are provided with tightness joints 508, 509 and 510 respectively.

Evaporator Bg

FIG. 44 shows the operations implemented: Mass flow rate $m_1$ is introduced at the top of Bg at thermodynamical conditions close to the saturation and flows downwards under the effect of gravity; an outer heat conveyor is introduced in the same region, traversing vessel Bg from top to bottom, providing heat $Q_2$ while its temperature drops from $T_{g1}$ to $T_{g1'}$. Arrangments inside Bd are designed to achieve heat exchanges close to reversibility between the outer heat carrier and the working fluid; this means that vapor is formed from the top of said vessel Bg, the corresponding flow rate swelling as it descends in the vessel towards the bottom. It is clear at this step that the three fluxes
- outer sensible heat carrier
- vapor working fluid
- liquid working fluid descend altogether at co current, and remain in equilibrium. Heat $Q_2$ is not sufficient to evaporate $\overline{m}_1$. The rest of the liquind $m_1$ is evacuated at the bottom of Bg.

Figure 52:
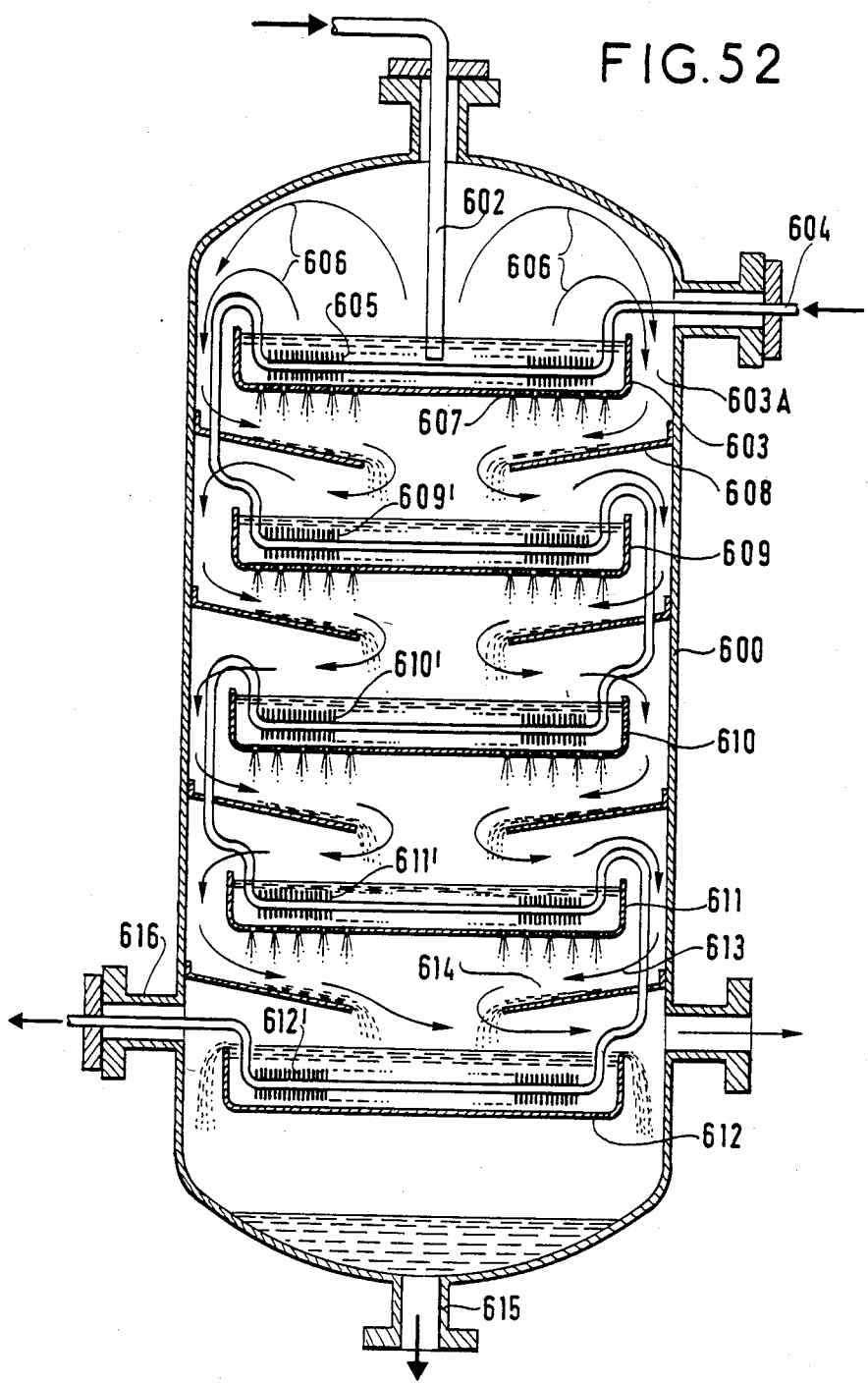
FIG. 52 is a vertical sectional view of a heat exchange vessel designed to achieve heat exchange close to reversibility between an outer heat carrier and the system working fluid.

The general arrangement described in FIG. 52 realises these operations; it is enclosed in a vessel 600 and embodies the following features:

A pipe 602 conveying the operating liquid feeds the cylindrical container 603; the diameter of the latter being smaller than that of vessel 600, to leave an annular gap 603A. The outer heat carrier is introduced through a pipe 604 thirough a skyvefin arrangement 605 embedded in container 603.

The heat evaporates the working fluid contained in 603; arrows 606 indicate the path of the vapor produced. The peripheral part of the bottom of 603 is pierced with holes 607 allowing the working fluid to be evacuated. As the latter falls in rain from holes 607 it is received by a conical receptable 608 which gathers it and let it drop into contanier 609.

Containers 609, 610, 611, 612 are similar to container 603, embedding respectively skyvefin arrangements 609', 610', 611', 612', altogether with 603 being placed in series along the outer heat carrying circuit, each of the containers yields its own flux rate of vapor in thermodynermical equilibrium with its liquid.

This flow rate mixes with the flux of vapor produced by the upstream containers: the total flux, slighthy out of equilibrium with the liquid in presence, following pathes indicated by arrows 613, passes in cross flow through the rain of working fluid drops in regions 614; thus a situation close to equilibrium is restored by contact between the the phases. In container 612' the mass flow rate $\overline{m}$ overflows, gathers in the bottom of vessel 600, and is subsequently removed through 615. The sensible heat conveyor leaves through pipe 616.

What is claimed:

1. A heat pump including:
   a first assembly including a distillation column (Kd) having a hottest end and a coldest end and working by diphasic contact with a working fluid made of at least two mixable pure substances, at a first pressure value and in a first temperature range,
   and a second assembly including a second column (Kg) having a hottest end and a coldest end and working by diphasic contact at a second pressure value lower than said first pressure value and in a second temperature range,
   the first assembly including, associated to said first distillation column, a first boiler (Bd) and a first condenser (Cd),
   means for establishing a first pair of flows between said first boiler and said second condenser,
   means for establishing a second pair of flows between said first condenser and said second boiler,
   means for establishing at least one liquid flow between two intermediate sections of same concentration of both columns and for directing liquid from said second column to said first column,
   the boilers being respectively placed at the hottest end of said distillation column and at the coldest end of said second column, and
   external sources for applying heat to said boilers, and said condensers supplying heat at external use points,
   and means for controlling all established flows and said boilers and said condensors such that said established flows exchange heat with one another and with the columns, so that the exchanges are in equilibrium and that each column receives in each point the heat corresponding to the reversibility condition and that
   the temperature of the condensers of both columns are substantially the same.

2. The heat pump according to claim 1 wherein:
   said means for establishing said first pair of flows includes a first counter-current exchanger (E1),
   said means for establishing said second pair of flows includes a second counter-current exchanger (E2), and
   said means for establishing liquid flow between two intermediate sections include means for establishing a third pair of flows joining substantially the middle of said first column (Kd) to said second condenser and exchanging heat in a third counter-current exchanger (E3) and means for establishing a fourth pair of flows joining substantially the middle of said second column (Kg) to said first condenser and exchanging heat in a fourth counter current exchanger (E4).

3. A heat pump according to claim 1, in which at least one boiler or condenser associated to a column is linked to a steam extraction circuit which includes means for carrying steam to the condenser or boiler of the other column, said circuit further including a mechanism bringing the steam pressure from its value at an extraction point to its value at a reinjection point in said column, the heat pump further including means for establishing a liquid flow between said steam extraction and reinjection points, so as to obtain equality of the liquid flows in the sections of the same concentration of the columns.

4. A thermal machine to valorize heat at low temperature level by supplying heat at high temperature level including:
   a first assembly including a distillation column (Kd) having a hottest end and a coldest end and working by diphasic contact with a working fluid made two mixable pure substances, at a first pressure value and in a first temperature range,
   and a second assembly including a second column (Kg) having a hottest end and a coldest end working by diphasic contact at a second pressure value lower than said first pressure value, and in a second temperature range,
   said first assembly including, associated to said distillation column, a first boiler (Bd) and a first condenser (Cd),
   said second assembly including, associated to said distillation column, a first boiler (Bg) and a second condenser (Cg),
   means for establishing a first pair of flows between said first boiler and said second condenser,
   means for establishing a second pair of flows between said first condenser and said second boiler,
   means for establishing at least one liquid flow between two intermediate sections of same concentration of both columns, and for directing liquid from said second column to said first column,
   the condensers being placed respectively at the hottest end of the distillation column and at the coldest end of said second column,
   external sources supplying heat to the boilers, and the condensers supplying heat at external points of use,
   and means for controlling all established flows and such boilers and said condensers such that said established flows exchange heat with one another and with the column, so that the exchanges are in equilibrium and that each column receives in each point the heat corresponding to the reversibility condition and that
   the temperatures of both boilers are substantially the same.

5. The thermal machine according to claim 4 in which said means for establishing said first pair of flows includes a first counter-current exchanger (E1) for exchanging heat, said means for establishing said second pair of flows comprises a second counter-current exchanger (E2) for exchanging heat, said means for establishing said liquid flow between two intermediate sections includes means for establishing a third pair of flows joining substantially the middle of said distillation column to said second condenser and including a third counter-current heat exchanger (E3) for exchanging heat, and a means for establishing a fourth pair of flows joining substantially the middle of said second column to said first condenser and including a fourth counter-current exchanger (E4).

6. A thermal machine according to claim 5, in which at least one boiler or condenser associated to a column is linked to a steam extraction circuit which includes means for carrying steam to the condenser or boiler of the other column, said circuit further including a mechanism bringing the steam pressure from its value at an extraction point to its value at a reinjection point in said column, and the thermal machine further including a means for establishing a liquid flow between said steam extraction and reinjection points, so as to obtain equality of the liquid flows in the sections of same concentration of the columns.

* * * * *